(12) United States Patent
Nashiki

(10) Patent No.: US 7,291,945 B2
(45) Date of Patent: Nov. 6, 2007

(54) AC MOTOR AND CONTROL DEVICE THEREFOR

(75) Inventor: Masayuki Nashiki, Komaki (JP)

(73) Assignee: Denso Corporation, Kariya (JP)

( * ) Notice: Subject to any disclaimer, the term of this patent is extended or adjusted under 35 U.S.C. 154(b) by 259 days.

(21) Appl. No.: 11/176,351

(22) Filed: Jul. 8, 2005

(65) Prior Publication Data

US 2006/0006744 A1 Jan. 12, 2006

(30) Foreign Application Priority Data

Jul. 9, 2004 (JP) ............................. 2004-202579

(51) Int. Cl.
| | |
|---|---|
| H02K 37/14 | (2006.01) |
| H02K 1/14 | (2006.01) |
| H02K 1/27 | (2006.01) |
| H02K 21/14 | (2006.01) |

(52) U.S. Cl. .............................. 310/49 R; 310/156.34; 310/257

(58) Field of Classification Search ........... 310/156.01, 310/156.08, 156.32, 156.34, 156.35, 216, 310/257, 49 R; 29/596–598
See application file for complete search history.

(56) References Cited

U.S. PATENT DOCUMENTS

| | | | | |
|---|---|---|---|---|
| 4,406,958 A | * | 9/1983 | Palmero et al. | ........... 310/49 R |
| 6,359,357 B1 | * | 3/2002 | Blumenstock | .............. 310/90.5 |
| 6,462,430 B1 | * | 10/2002 | Joong et al. | ............... 290/40 C |
| 6,479,911 B1 | * | 11/2002 | Koike et al. | .............. 310/49 R |
| 7,105,974 B2 | * | 9/2006 | Nashiki | ....................... 310/185 |
| 2002/0190585 A1 | * | 12/2002 | Sakamoto | .................. 310/49 R |
| 2003/0057784 A1 | * | 3/2003 | Kanebako | ................... 310/90.5 |
| 2005/0012427 A1 | * | 1/2005 | Seki et al. | .................... 310/257 |
| 2005/0099082 A1 | | 5/2005 | Nashiki | |
| 2006/0244337 A1 | * | 11/2006 | Makita et al. | ............... 310/257 |
| 2007/0024145 A1 | * | 2/2007 | Makita et al. | ............... 310/159 |

FOREIGN PATENT DOCUMENTS

JP A 2001-161055 6/2001

* cited by examiner

Primary Examiner—Tran Nguyen
(74) Attorney, Agent, or Firm—Oliff & Berridge, PLC

(57) ABSTRACT

A rotor, which is rotatable about a rotor shaft, comprises N poles and S poles alternately disposed in the circumferential direction, and rotor-side neutral poles disposed adjacent to the N poles and the S poles along the axial direction of the rotor, being magnetically connected to their back yoke. A stator comprises two modules which are adjacently disposed in the axial direction of the rotor. Each of these two modules comprises a winding wound, in a loop shape, around the rotor shaft, stator-side neutral poles disposed at positions opposed to the rotor-side neutral poles, stator poles each of which is disposed at a position opposed to either the N pole or the S pole, and a back yoke which connects the stator-side neutral poles and the stator poles to surround the winding.

30 Claims, 27 Drawing Sheets

AC MOTOR AND CONTROL DEVICE THEREFOR

CROSS-REFERENCE TO RELATED APPLICATION

This application is based on and claims the benefit of priority from earlier Japanese Patent Application No. 2004-202579 filed on Jul. 9, 2004, the description of which is incorporated herein by reference.

BACKGROUND OF THE INVENTION

1. Field of the Invention

This invention relates to an AC motor, such as a stepping motor which is rotated and driven by polyphase current, and to a control device therefor.

2. Related Art

Conventionally, stepping motors are known which are rotated and driven by using two phase currents of a P phase and a Q phase as disclosed in Japanese Published Unexamined Patent Application No. 2001-161055. FIG. 51 is a cross section showing a configuration of a conventional two-phase stepping motor in case of eight poles. FIG. 52 is a circumferential expansion plan of a permanent magnet provided in a rotor of the two-phase stepping motor shown in FIG. 51. FIG. 53 is a circumferential expansion plan of the stator poles of the two-phase stepping motor shown in FIG. 51.

In the conventional two-phase stepping motor shown in these figures, a positive current is passed to a P-phase winding 128. Assuming that a magnetomotive force is then generated from a permanent magnet 121 in a direction toward a stator pole 124, a rotor is rotationally transferred to a position where the stator poles 124 and the N poles of the permanent magnet 121 face with each other, and is stopped. Then, P-phase current is rendered to be zero, and a positive current is passed to a Q-phase winding 129. Assuming that a magnetomotive force is then generated from a permanent magnet 122 in a direction toward stator poles 126, the rotor is rotationally transferred to a position where the N poles of the permanent magnet 122 and the stator poles 126 face with each other, rotating at a mechanical angle of 22.5 degrees, i.e. an electrical angle of 180 degrees. Subsequently, when Q-phase current is rendered to be zero, and a negative current is passed to the P-phase winding 128, the rotor is rotationally transferred to a position where the stator poles 124 and the S poles of the permanent magnet 121 face with each other, rotating at a mechanical angle of 22.5 degrees. Then, when the P-phase current is rendered to be zero, and a negative current is passed to the Q-phase winding 129, the rotor is rotationally transferred to a position where the stator poles 126 and the S poles of the permanent magnet 122 face with each other, rotating at a mechanical angle of 22.5 degrees. Then, when the Q-phase current is rendered to be zero and a positive current is passed to the P-phase winding 128, the rotor is rotationally transferred to a position where the stator poles 124 and the N poles of the permanent magnet 121 face with each other, rotating at a mechanical angle of 22.5. Thus, the rotor returns to the original position, ultimately rotating once. By repeating the above operations successively, the motor can be subjected to rotation control. When a reverse rotation is required, the above operations may be reversely carried out. The steps of operations described above are for the case where currents of two phases are intermittently provided. If controlling two-phase AC sinusoidal currents is effected with a phase difference of 90 degrees in electrical angle, smoother rotation control can be performed.

Motors of the type as shown in FIGS. 51, 52 and 53 are used being incorporated in various apparatuses. Thus, there has been a need for motors of higher performance, smaller size and lower costs. For this reason, magnetic circuits of the motors having conventional configurations have been improved to effectively utilize the magnetic flux generated by the permanent magnets 121 and 122. There has also been a problem that leakage of the magnetic flux between the stator poles of the P phase and those of the Q phase causes excessive torque ripples or vibration, and noises. Further, in controlling the voltage and current of a two-phase motor by a transistor inverter, unlike three-phase AC control which requires six transistors for parallel three-phase control, more number of transistors, such as eight, is required to thereby induce problematic deterioration in the driving efficiency of transistors and induce complexity in control.

SUMMARY OF THE INVENTION

The present invention has been made in view of such circumstances, and has as its object to provide an AC motor of smaller size and low costs, which can increase generation of torque, and to provide a control device therefor.

In the present invention, in order to simply explain the gist to the present invention, the inventor introduced the new technical terms of paired rotor-side and stator-side "neutral poles" and a "stator pole." In the present specification, the term "neutral poles" are defined to mean particularly shaped portions of a rotor and a stator which are able to mutually transmit magnetic flux to the counterpart between the rotor and stator, without generating torque therebetween. Thus the rotor-side and stator-side "neutral poles" are not limited to particular shapes and area sizes, provided that the transmission of the flux is performed. In addition, the "stator pole" is defined to mean a tooth portion formed on a stator so as to make flux pass therethrough intensively.

In order to dissolve the problems described above, the AC (alternating current) motor of the present invention comprises: a rotor comprising a rotation shaft rotatable around a longitudinal central axis in an axial direction of the rotation shaft, N magnetic poles and S magnetic poles fixedly disposed by turns around the rotation shaft in a circumferential direction of the rotation shaft, and rotor-side neutral poles disposed fixedly and juxtaposedly to the N magnetic poles and the S magnetic poles, respectively, along the axial direction, a back yoke magnetically linked with the N magnetic poles and the S magnetic poles so as to serve as a back yoke member together with the N magnetic poles and the S magnetic poles; and a stator comprising a plurality of modules disposed in the axial direction to be opposed to the rotor, each module comprising:

a winding wound around the rotation shaft in the circumferential direction in a loop shape;

stator-side neutral poles disposed to be opposed to the rotor-side neutral poles;

stator poles disposed to be opposed to either of the N magnetic poles and the S magnetic poles; and back yokes magnetically linking the stator-side neutral poles and the stator poles to each other.

Thus, the flux generated by the N poles and the flux generated by the S poles can be separately utilized to increase generation of torque. Considering the case where a torque requested as its specifications is constant, an AC motor of smaller size and lower costs, which generates the required torque may be realized.

Preferably, the back yokes in each of the modules is formed to have a magnetic circuit that allows each of a flux F1 generated from each N magnetic pole and a flux F2 generated from each S magnetic pole to interlink the winding via both of each rotor-side neutral pole and each stator-side neutral pole in the same direction. Thus, by providing such a magnetic circuit, the overall amount of flux contributing to the generation of torque can be increased.

Preferably, when the plurality of modules are n (positive integer more than two), the stator poles included in each module are disposed along the same circumference whose center is the rotation shaft, at pitches of substantially 180 degrees in electrical angle, the disposed locations of the stator poles being shifted "360/n" degrees in electrical angle module by module. Thus, the rotor can be efficiently rotated in one direction using the plurality of modules corresponding to the plurality of phases.

Still preferably, wherein, in each module, in place of the stator poles to be disposed along the same circumference around the rotation shaft at pitches of substantially 360 degrees in electrical angle, the stator-side neutral poles are disposed, or, the stator poles to be disposed along the same circumference around the rotation shaft at pitches of substantially 360 degrees in electrical angle is removed. Thus, by increasing the area of the stator poles, the flux linkage to the winding can be increased to decrease the leakage flux between the stator poles to thereby increase generation of torque.

Preferably, the plurality of modulus are two in number, one module being assigned to a P phase and the other module being assigned to a Q phase, the P and Q phases providing two phases, the stator poles for the P phase are disposed along the same circumference centered at the rotation shaft, at pitches of substantially 180 degrees in electrical angle, and the stator poles for the Q phase are disposed along the same circumference centered at the rotation shaft, at pitches of substantially 180 degrees electrical angle, but shifted substantially 90 degrees in electrical angle compared to the stator poles for the P-phase.

Thus, a two-phase AC motor consisting of a P phase and a Q phase can be realized. Further, the flux that has been produced in the N and S poles of the rotor, for the respective phases, can be effectively utilized to increase generation of torque.

By way of example, the plurality of stator poles in each module are magnetically aggregated to be linked to one of the stator stator-side neutral poles. By constituting a magnetic path with the aggregation of the plurality of stator poles, the leakage flux between different stator poles can be reduced to enable effective use of the flux, which further enables increase of torque, improvement in power factors, and improvement in efficiency.

By way of example, both of the rotor and the stator are entirely or partially made of soft magnetic metal powder material and formed by pressing the material. Thus, a magnetic circuit of a three-dimensional form is constituted to reduce flux loss and to comparatively facilitate manufacture of complicated forms to thereby reduce manufacturing costs.

As an example, 8, both of the rotor and the stator are entirely or partially formed using a member made by mutually combining soft magnetic metal powder material and magnetic steel sheet. Thus, a flat rolled magnetic steel sheet and strip can be used for thin and easily breakable parts, such as the tips of a stator pole, while a soft magnetic metal powder material can be used for the other parts to thereby achieve a good balance between the reduction of flux loss and the securing of strength.

It is preferred that the winding for the P phase uses part of winding Lw of three-phase AC windings Lu, Lv and Lw, the winding Lu being oppositely arranged to the winding Lw and the winding for the Q phase uses part of winding Lw of the three-phase AC windings Lu, Lv and Lw, the winding Lw being oppositely arranged to the winding Lv. This enables control such that three-phase current is passed for the P phase and the Q phase windings to thereby simplify the configuration required for control.

It is also preferred that the plurality of stator poles disposed in each module is grouped into n-groups and the stator poles belonging to each group are relatively shifted along the circumference by an amount of integral multiple of 360/(m×n) degrees in electrical angle, where n is an positive integer and m is an order of torque ripples to be decreased. In addition, the N magnetic poles and the S magnetic poles disposed in the rotor may be grouped into n-groups, every magnetic pole, and the N magnetic poles belonging to each group and the S magnetic poles belonging to each group are relatively shifted along the circumference by an amount of integral multiple of 360/(m×n) degrees in electrical angle, where n is an positive integer and m is an order of torque ripples to be decreased. Thus, the torque ripples having a desired order, which are foreseen to be large, can be surely reduced.

Preferably, the plurality of modulus are two in number, each module being assigned to a U phase, a V phase, and a W phase providing three phases, the stator poles disposed in each of the two modules are mutually shifted at pitches of substantially 120 degrees in electrical angle, the winding included in one of the modules has a U-phase winding and a first V-phase winding whose turn directions are opposite to each other, the winding included in the other of the modules has a second V-phase winding and a W-phase winding whose turn directions are opposite to each other, and the first and second V-phase windings are connected in series and whose turn directions are opposite to each other.

By constituting the three-phase AC motor in this way, a motor of high efficiency with reduced vibration and noises can be realized. Further, such a motor can be subjected to mass production, and can be driven by means of an inexpensive three-phase motor inverter employed, to thereby reduce costs.

In this configuration, of the windings providing the U-, V- and W-phase windings, the U-phase winding and the first V-phase winding to be wound at the same electromagnetic location may be aggregated to a single winding and the second V-phase winding and the W-phase winding to be wound at the same electromagnetic location are aggregated to a single winding. Thus, the windings can be simplified and copper loss can be reduced to thereby improve output.

As another preferred example, the AC motor further comprises means for controlling current Ip flowing through the winding for the P phase and current Iq flowing through the winding for the Q phase so that a relation of $$Ta = Wp \times Ep \times Ip + Wq \times Eq \times Iq$$

is met, where Ta is a torque command, Ep=dφp/dθ is a rate of changes in rotation angles of flux φp interlinking the winding for the P-phase, Eq=dφq/dθ is a rate of changes in rotation angles of flux φq interlinking the winding for the Q-phase, Wp is the number of turns of the winding for the P-phase, and Wq is the number of turns of the winding for the Q-phase.

By controlling the current passed to the winding of each phase using this control device, an AC motor which generates desired torque can be realized.

DETAILED DESCRIPTION OF PREFERRED EMBODIMENTS

Hereinafter, an AC (alternating current) motor according to one embodiment of the present invention will now be described in detail with reference to the drawings.

Figure 1:
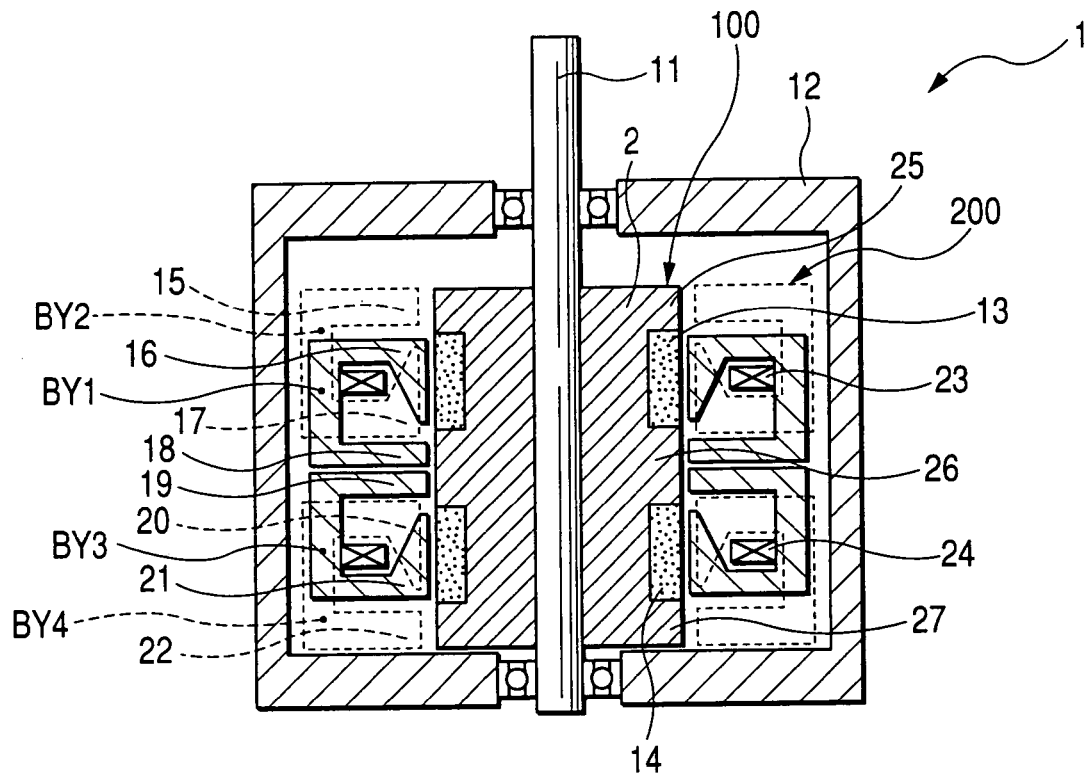
FIG. 1 is a vertical cross section of an AC motor according to an embodiment of the present invention.

FIG. 1 is a vertical cross section of an AC motor according to one embodiment. An AC motor 1 according to the present embodiment shown in FIG. 1 is a two-phase motor comprising two modules for a P phase and a Q phase (the module corresponding to each of the phases is referred to an "actuator"). The two-phase motor comprises a rotor 100, a stator 200 and a motor case 12. The rotor 100 comprises a rotor shaft 11, a P-phase permanent magnet 13, a Q-phase permanent magnet 14 and a back yoke 2.

Figure 2:
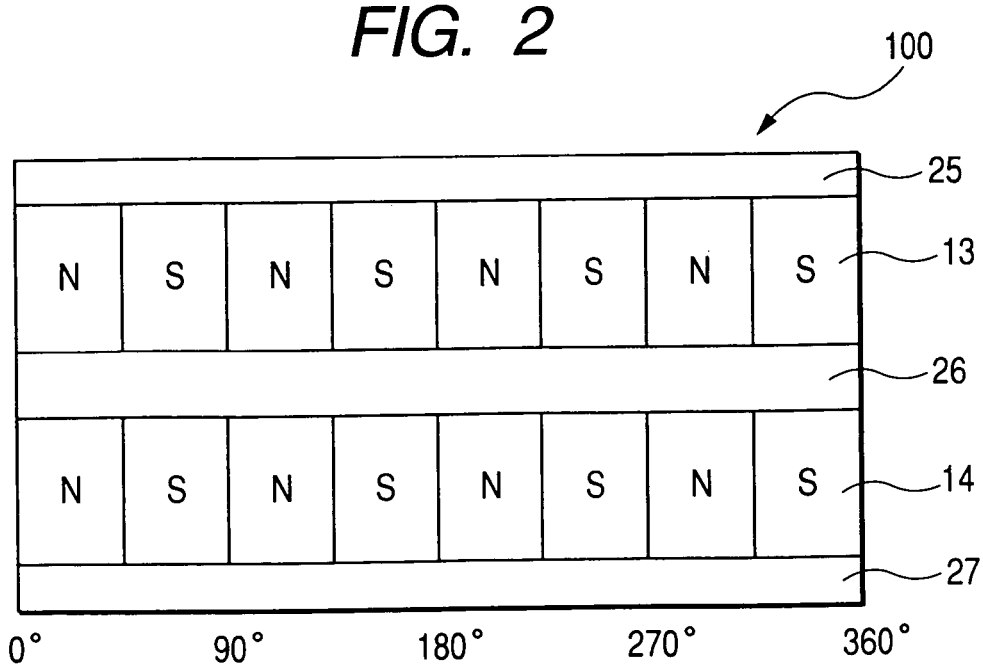
FIG. 2 is an expansion plan of an eight-pole rotor along the direction of rotation.

FIG. 2 is an expansion plan of the eight-pole rotor 100 along the direction of rotation. The angles plotted along the horizontal axis indicate mechanical angles, in which 360 degrees mean one rotation. The N poles and the S poles of the P-phase permanent magnet constituting rotor poles on one hand, are alternately disposed along the direction of rotation, while the N poles and the S poles of the Q-phase permanent magnet 14 constituting rotor poles on the other hand, are also alternately arranged along the direction of rotation. These P-phase and Q-phase permanent magnets 13, 14 are arranged along the rotor shaft 11 with a predetermined interval therebetween. Rotor-side neutral poles 25, 26, 27, i.e. portions of the back yoke 2, are arranged along the rotor shaft 11, being adjacent to the P-phase and Q-phase permanent magnets 13, 14.

Figure 3:
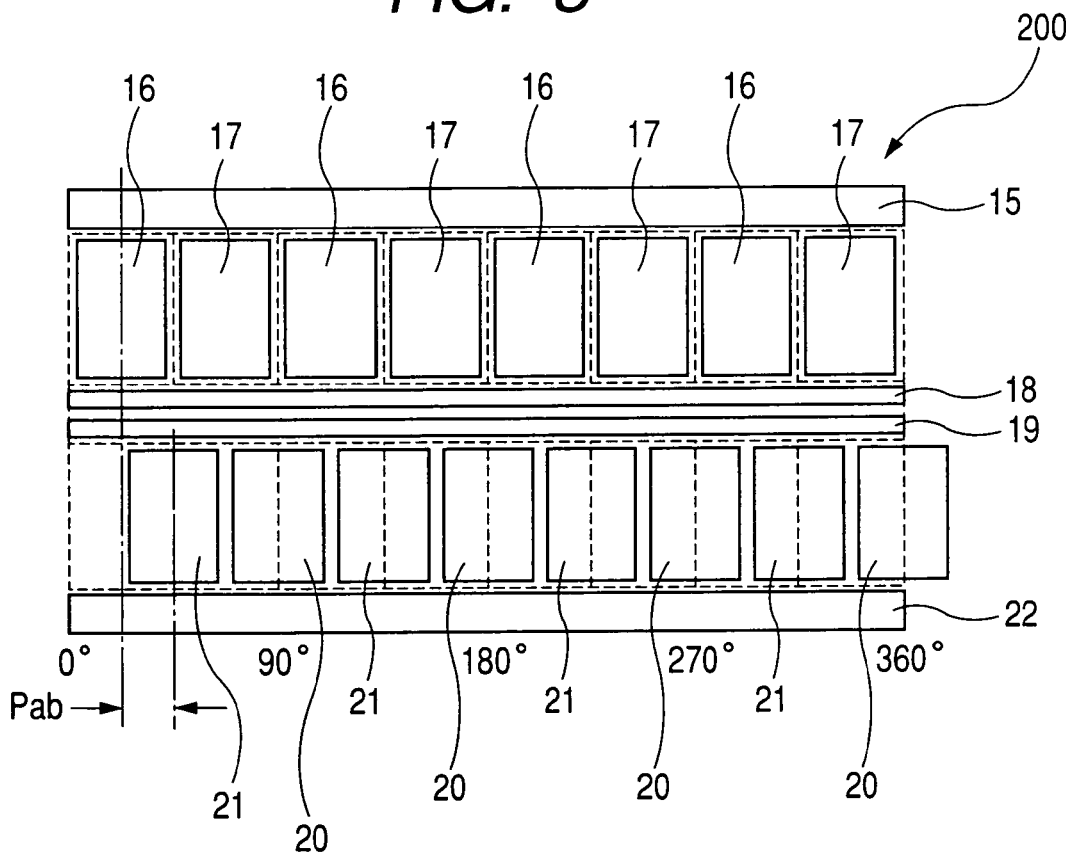
FIG. 3 an expansion plan of stator poles along the direction of rotation, which are disposed opposed to a rotor.

The stator 200 comprises a P-phase winding 23, a Q-phase winding 24, P-phase stator poles 16, 17, Q-phase stator poles 20, 21, P-phase stator-side neutral poles 15, 18, and Q-phase stator-side neutral poles 19, 22. FIG. 3 is an expansion plan, along the direction of rotation, of the individual stator poles opposed to the rotor 100. The degrees plotted along the horizontal axis are mechanical angles, in which 360 degrees mean one rotation. The P-phase stator poles 16 in forward direction are positioned opposed to the P-phase permanent magnet 13 of the rotor 100. A P-phase stator-side neutral pole 18 positioned opposed to the rotor-side neutral pole 26 is to direct magnetic flux F1 which passes through the P-phase stator poles 16 so as to interlink the P-phase winding 23. The P-phase stator poles 16 and the P-phase stator-side neutral pole 18 are connected with each other through the back yoke of the stator 200, so as to surround the P-phase winding 23. Similarly, the P-phase stator poles 17 in reverse direction, which are shown by broken lines, are positioned opposed to the P-phase permanent magnet 13 of the rotor 100. The P-phase stator-side neutral pole 15 opposed to the rotor-side neutral pole 25 is to direct magnetic flux F2 which passes through the P-phase stator poles 17 so as to interlink the P-phase winding 23. The P-phase stator poles 17 and the P-phase stator-side neutral pole 15 are connected with each other through the back yoke of the stator 200, so as to surround the P-phase winding 23. The flux F1 and F2 are configured to constitute flux linkages in the same direction for the P-phase winding 23.

The Q-phase stator poles 21 in forward direction are positioned opposed to the Q-phase permanent magnet 14 of the rotor 100. A P-phase stator-side neutral poles 19 positioned opposed to the rotor-side neutral pole 26 is to direct magnetic flux F3 which passes through the Q-phase stator poles 21 so as to interlink the P-phase winding 24. The Q-phase stator poles 21 and the Q-phase stator-side neutral pole 19 are connected with each other through the back yoke of the stator 200, so as to surround the P-phase winding 24. Similarly, the Q-phase stator poles 20 in reverse direction, which are shown by broken lines, are positioned opposed to the Q-phase permanent magnet 14 of the rotor 100. The Q-phase stator-side neutral pole 22 opposed to the rotor-side neutral pole 27 is to direct magnetic flux F4 which passes through the Q-phase stator poles 20 so as to interlink the Q-phase winding 24. The Q-phase stator poles 20 and the Q-phase stator-side neutral pole 22 are connected with each other through the back yoke of the stator 200, so as to surround the Q-phase winding 24. The magnetic flux F3 and F4 are configured to constitute flux linkages in the same direction for the Q-phase winding 24.

Figure 4:
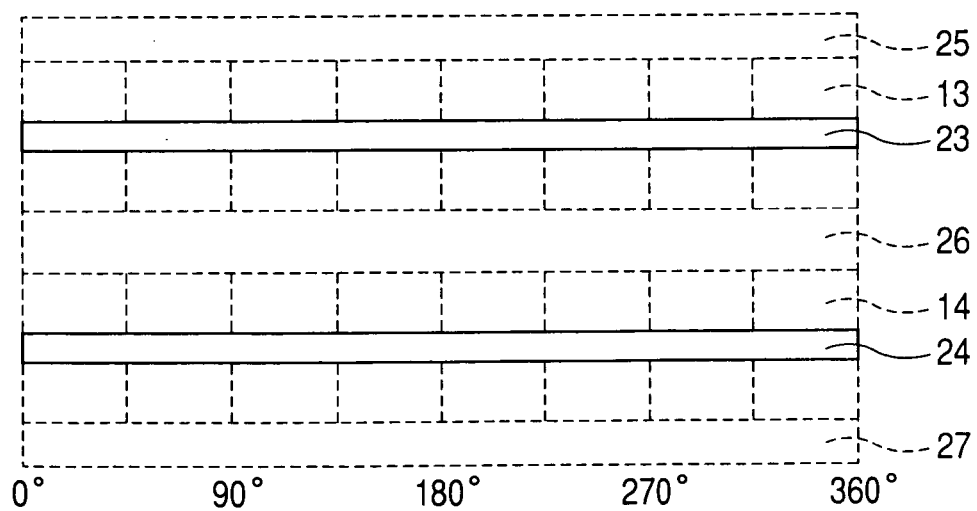
FIG. 4 is an expansion plan of a P-phase winding and a Q-phase winding along a direction of rotation.

FIG. 4 is an expansion plan of the P-phase and Q-phase windings 23 and 24 along the direction of rotation. The degrees plotted along the horizontal axis are mechanical angles, in which 360 degrees mean one rotation. As shown in FIG. 4, the P-phase and the Q-phase windings 23 and 24 have a loop shape. The broken lines in FIG. 4 show the shapes of the permanent magnets 13, 14 of the rotor 100 corresponding to the respective rotational angles, and the shapes of the rotor-side neutral poles 25, 26, 27.

Figure 5:
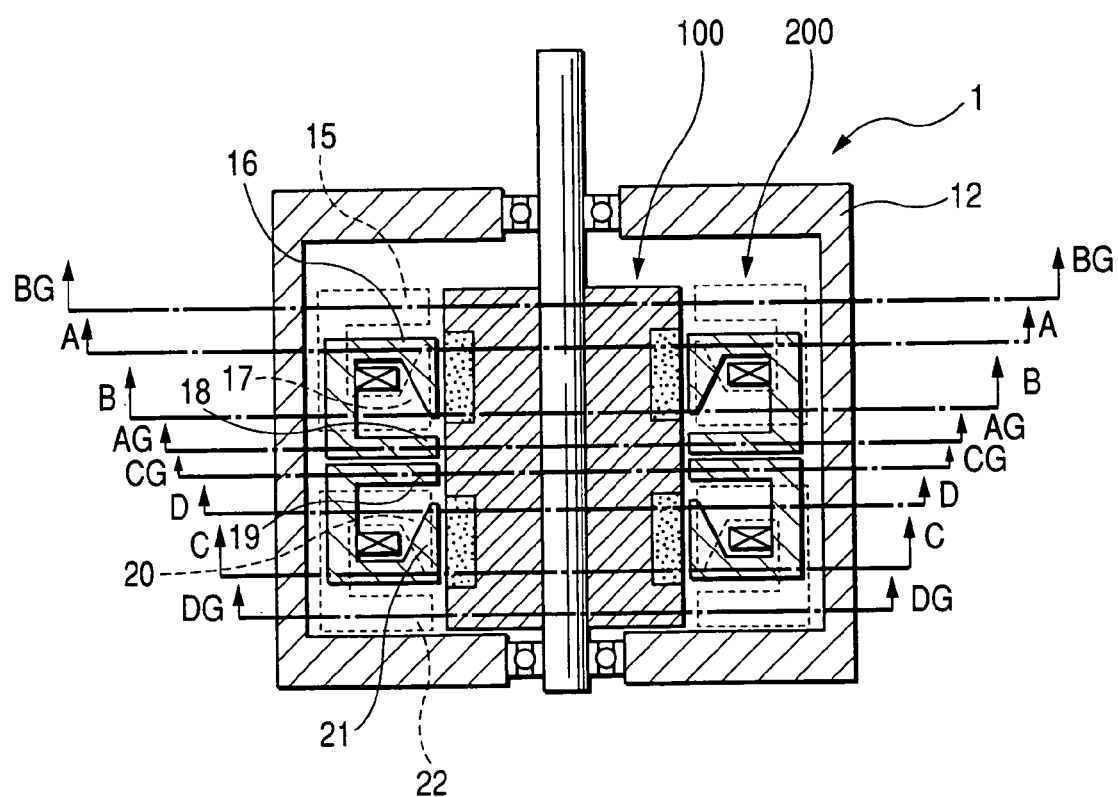
FIG. 5 is an illustration showing the positions of cross sections of a stator according to the present embodiment.
Figure 6:
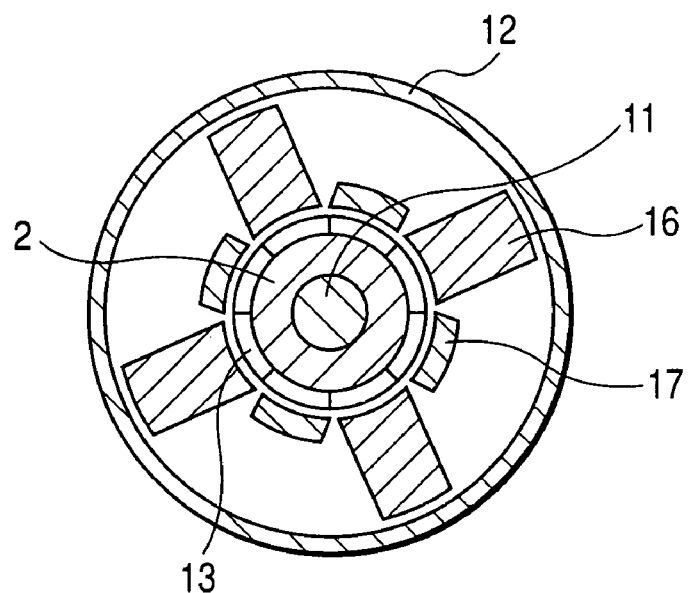
FIG. 6 is a cross section taken along an A-A line of FIG. 5.
Figure 7:
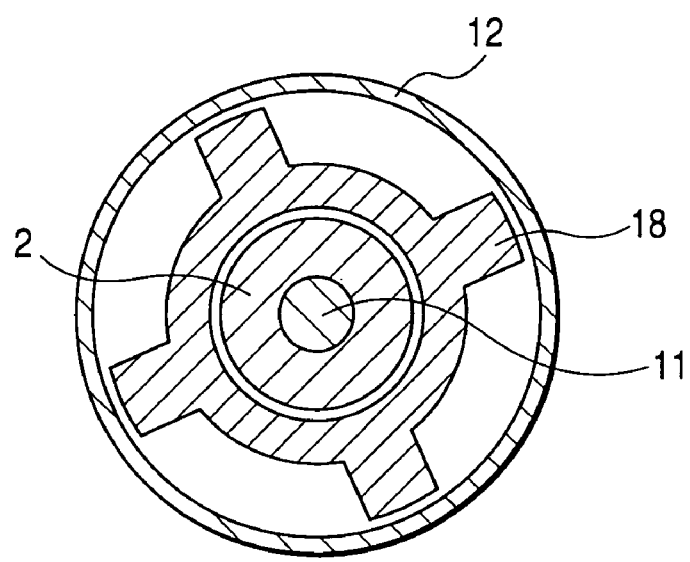
FIG. 7 is a cross section taken along an AG-AG line of FIG. 5.
Figure 8:
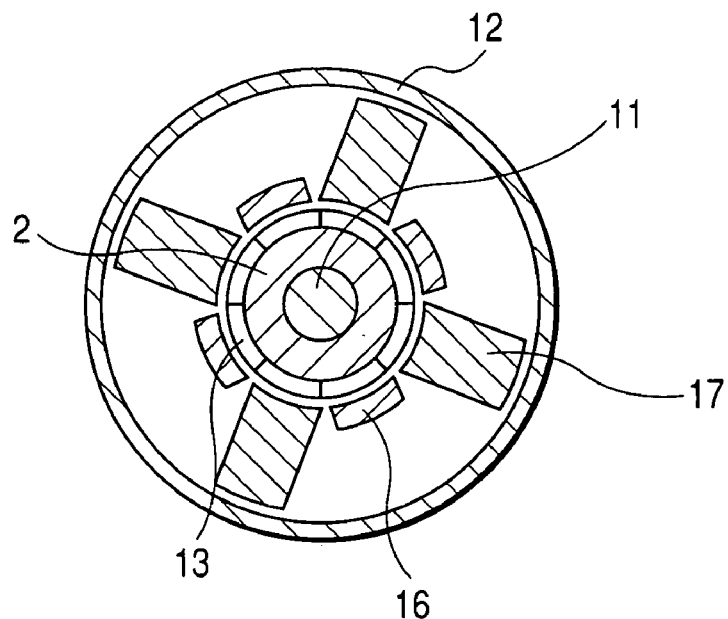
FIG. 8 is a cross section taken along a B-B line of FIG. 5.
Figure 9:
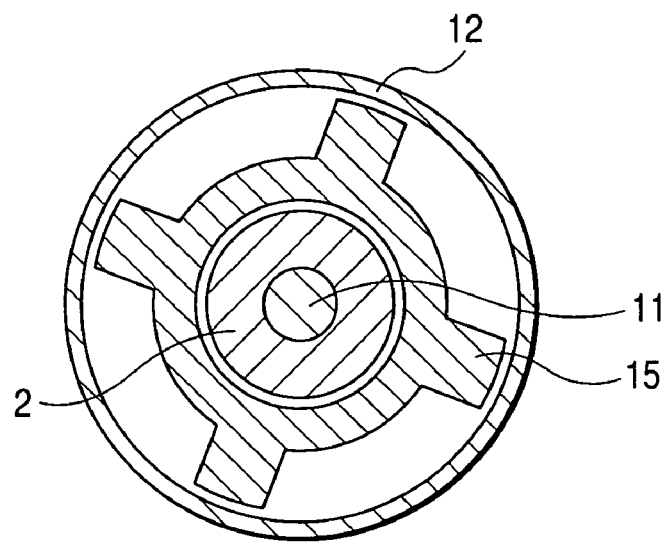
FIG. 9 is a cross section taken along a BG-BG line of FIG. 5.
Figure 10:
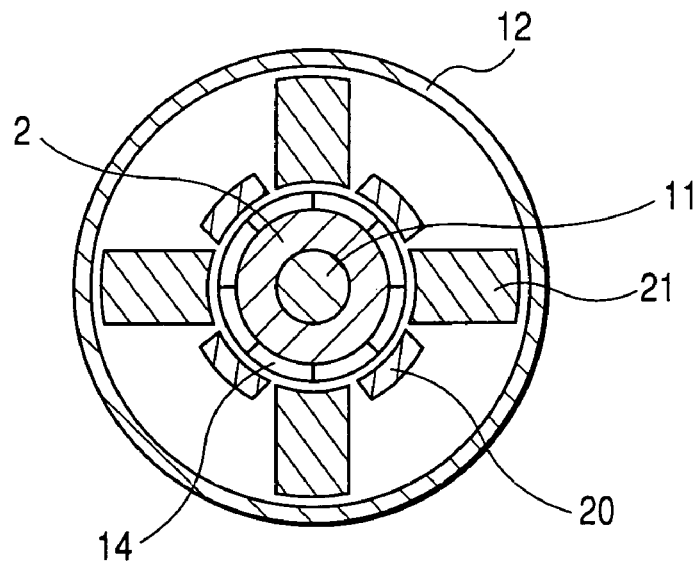
FIG. 10 is a cross section taken along a C-C line of FIG. 5.
Figure 11:
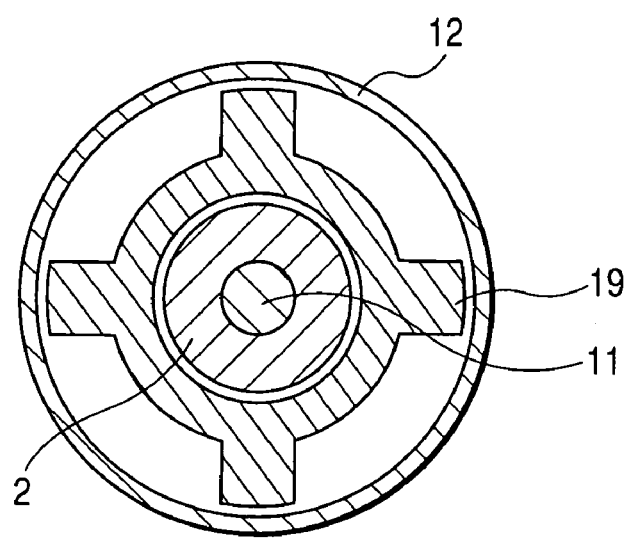
FIG. 11 is a cross section taken along a CG-CG line of FIG. 5.
Figure 12:
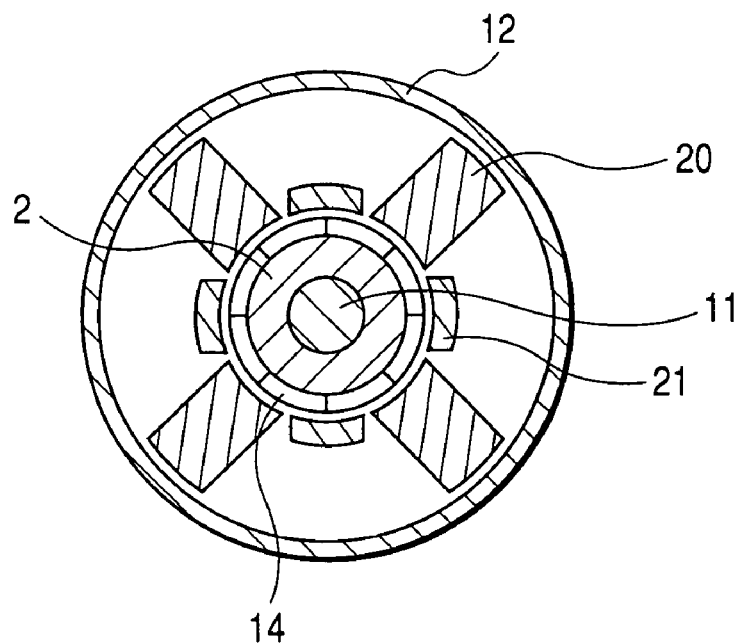
FIG. 12 is a cross section taken along a D-D line of FIG. 5.
Figure 13:
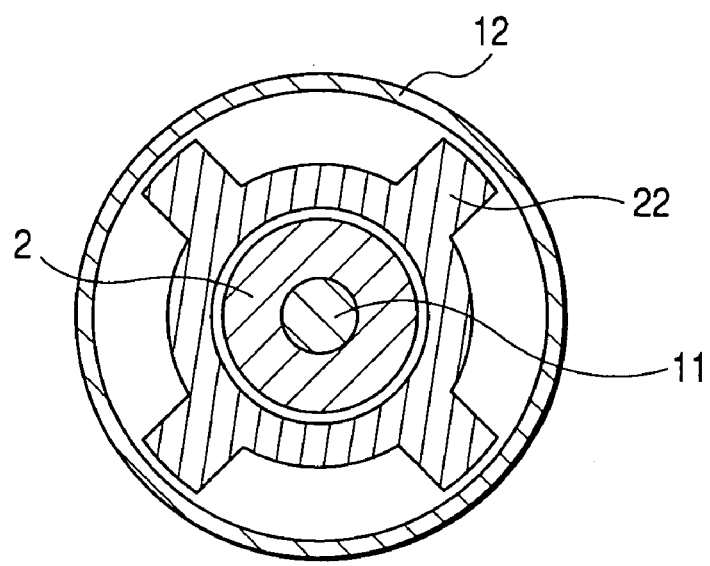
FIG. 13 is a cross section taken along a DG-DG line of FIG. 5.

The form of the stator 200 is described in detail hereunder. FIG. 5 shows positions of cross sections of the stator 200 according to the present embodiment. FIG. 6 is a cross section taken along an A-A line of FIG. 5 to show cross-sectional shapes of the P-phase stator poles 16, 17. FIG. 7 is a cross section taken along an AG-AG line of FIG. 5 to show a cross-sectional shape of the P-phase stator-side neutral pole 18. FIG. 8 is a cross section taken along a B-B line of FIG. 5 to show cross-sectional shapes of the P-phase stator poles 16, 17. FIG. 9 is a cross section taken along a BG-BG line of FIG. 5 to show a cross-sectional shape of the P-phase stator-side neutral pole 15. FIG. 10 is a cross section taken along a C-C line of FIG. 5 to show cross-sectional shapes of the Q-phase stator poles 20, 21. FIG. 11 is a cross section taken along a CG-CG line of FIG. 5 to show a cross-sectional shape of the Q-phase stator-side neutral pole 19. FIG. 12 is a cross section taken along a D-D line of FIG. 5 to show cross-sectional shapes of the Q-phase stator poles 20, 21. FIG. 13 is a cross section taken along a DG-DG line of FIG. 5 to show a cross-sectional shape of Q-phase stator-side neutral pole 22.

The stator poles are paired with the stator-side neutral poles which are magnetically connected to the stator poles through a magnetic path on the outer-diameter side of the stator 200. Specifically, the P-phase stator poles 16 and the P-phase stator-side neutral pole 18, which are physically connected to each other, constitute a magnetic circuit through the magnetic path on the outer-diameter side of the stator 200. Similarly, the P-phase stator poles 17 and the P-phase stator-side neutral pole 15, which are physically connected to each other, constitute a magnetic circuit through the magnetic path on the outer-diameter side of the stator 200. The Q-phase stator poles 21 and the Q-phase stator-side neutral pole 19, which are physically connected to each other, constitute a magnetic circuit through the magnetic path on the outer-diameter side of the stator 200. The Q-phase stator poles 20 and the Q-phase stator-side neutral pole 22, which are physically connected to each other, constitute a magnetic circuit through the magnetic path on the outer-diameter side of the stator 200. These four pairs of magnetic circuits are arranged so that the stator poles 16, 17, 20, 21 are magnetically isolated from each other in the circumferential direction to an extent that the leakage flux from between the poles in the direction of rotation would not cause a problem.

It should be appreciated that the AC motor of the present invention is an eight-pole motor wherein stator poles, four per each, of the same phase are arranged on a circumference at the pitch of a 360-degree electrical angle. Since these stator poles of the same phase exhibit invariable magnetic effects in the state of being magnetically connected with each other, they may be physically coupled to each other to enhance the strength of the stator 200. In particular, as shown in FIGS. 7, 9, 11 and 13, the stator-side neutral poles 15, 18, 19, 22 may be annularly connected on the inner-diameter side to increase the facing area on the side of the gap. Accordingly, magnetic resistance between the stator-side neutral poles 15, 18, 19, 22, and the rotor-side neutral poles 25, 26, 27 can be reduced to thereby obtain good electromagnetic effects. Further, the stator-side neutral poles 18, 19, which are axially adjacent to each other, may be magnetically connected with each other to simplify the configuration of the stator 200, provided that the magnetic resistance between the stator-side neutral poles 18, 19, and the rotor-side neutral pole 26 is sufficiently small from the viewpoint of motor operation.

Hereinafter, the electromagnetic operation of the AC motor according to the present embodiment is described comparing with an AC motor of a conventional structure shown in FIG. 51. Reference is made to a magnetic flux interlinking a P-phase winding 128 by focusing on one element of the AC motor, i.e. only the stator poles 124, 125, and one pair of the N pole and the S pole of a permanent magnet 121 in the AC motor having the conventional structure shown in FIG. 51. The principle may be typically depicted by an illustration in FIG. 14. Permanent magnets 56, 57 correspond to one pair of the N pole and the S pole included in the permanent magnet 121 shown in FIG. 52. A back yoke 55 corresponds to a back yoke 123 shown in FIG. 51. A winding 58 corresponds to the P-phase winding 128 shown in FIG. 51. The flux linkage in the one element of the AC motor shown in FIG. 51 results in a flux as shown by reference A in FIG. 14, i.e. a flux in which the flux emitted from the N-pole permanent magnet 56 goes around the winding 58 and returns to the S-pole permanent magnet 57.

Figure 15:
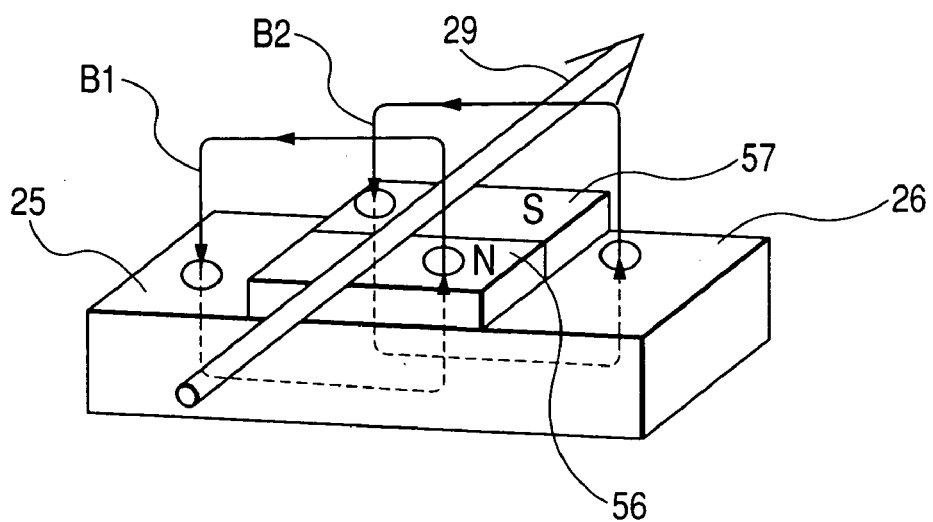
FIG. 15 illustrates a model of flux linkage to a winding of an AC motor according to the present embodiment.

Reference is now made to a magnetic flux interlinking the P-phase winding 23 by focusing on one element of the AC motor, i.e. only the stator poles 16, 17, one combination of the P-phase stator-side neutral poles 15, 18, and one pair of the N pole and the S pole of the permanent magnet 13 in the AC motor according to the present embodiment shown in FIG. 1. The principle may be typically depicted by an illustration in FIG. 15. The permanent magnets 56, 57 correspond to one pair of the N pole and the S pole included in the permanent magnet 13 shown in FIG. 2. The rotor-side neutral poles 25, 26 shown in FIG. 15 are the same as the rotor-side neutral poles 25, 26 shown in FIG. 2, i.e. correspond to a back yoke to the permanent magnets 56, 57. A winding 29 corresponds to the P-phase winding 23 shown in FIG. 1. As shown in FIG. 15, the flux linkage in the one element of the AC motor according to the present embodiment results in the sum of a flux which is emitted from the N-pole permanent magnet 56, goes around the winding 29 and thereafter returns to the N-pole permanent magnet 56 via the rotor-side neutral pole 25 (reference B1), and a flux which is emitted from the rotor-side neutral pole 26, goes around the winding 29 and returns to the S-pole permanent magnet 57 (reference B2).

Figure 14:
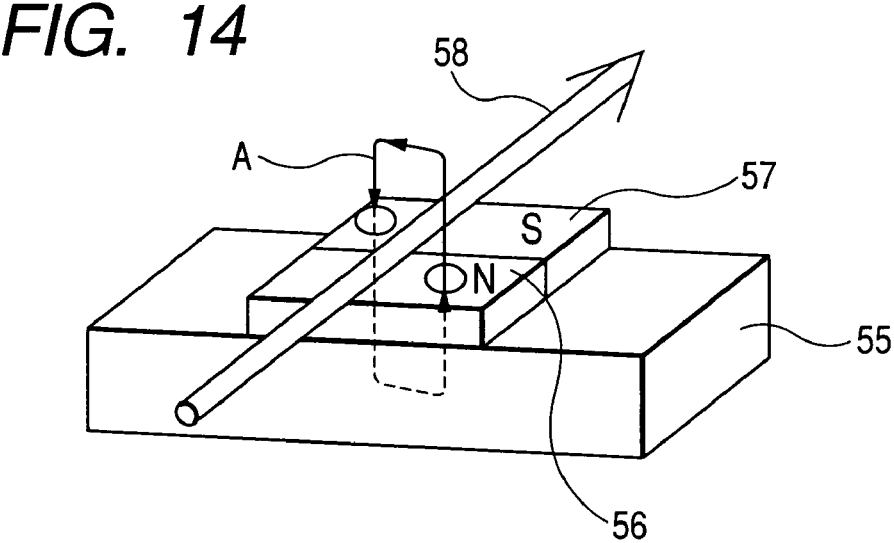
FIG. 14 illustrates a model of flux linkage to a winding of a conventional AC motor.

Consequently, comparing FIGS. 14 and 15, even though the surface areas of the magnets are the same, the AC motor according to the present embodiment shown in FIG. 15 attains a flux linkage which is nearly twice as large as the conventional one. It should be noted, however, that the AC motor shown in FIG. 15 requires to use rather thicker permanent magnet than the conventional one, because the former needs twice a large magnetomotive force in the permanent magnet. Since many thin rare earth permanent magnets of high performance are utilized recently, problems, such as oversize problem, hardly arise in designing motors if such magnets are made a little thicker.

Twice a large flux linkage to the winding 29 results in twice a large voltage of an AC motor. Thus, twice a large torque may be generated with the same amount of AC motor current. Accordingly, an AC motor can be miniaturized with its cost being reduced. In short, the AC motor 1 shown in FIG. 1 may realize high torque, small size and reduced costs by adding the stator-side neutral poles 15, 18, 19, 22, and the rotor-side neutral poles 25, 26, 27.

It should be appreciated that although the shapes of the stator poles 16, 17, 20, 21, which constitute, on an air gap side, a face opposed to the rotor 100, are illustrated as being rectangular in FIG. 3 for clarity of the principle, they may be trapezoid, skew form, ellipse, triangle, or the like. In an AC motor, major technical issues are reductions of cogging torque and torque ripples. Although the rotor poles shaped as shown in FIG. 2 and the stator poles shaped as shown in FIG. 3 exhibit large average torque, no countermeasure is provided as to the issues of cogging torque and torque ripples. These issues may be improved by altering the shape of the stators as described above.

Figure 16:
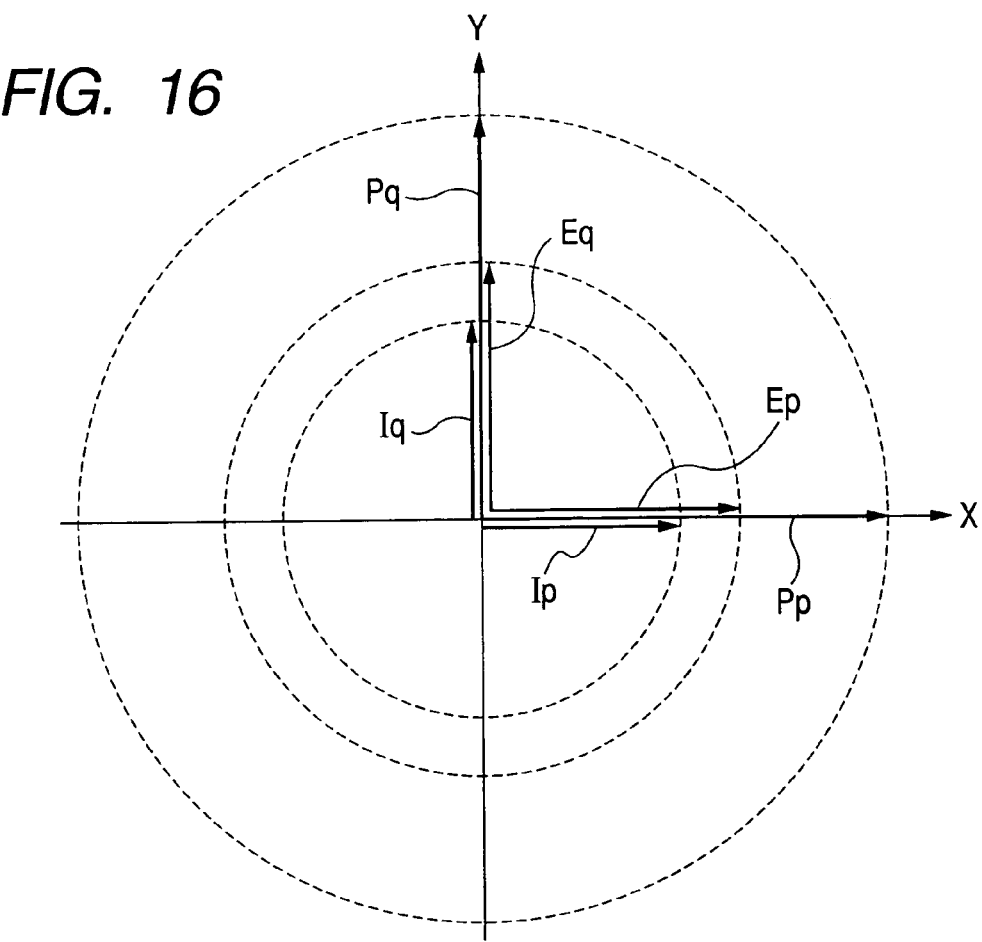
FIG. 16 is a vector diagram showing a relation between voltage, current and power of an AC motor according to the present embodiment.

Hereinafter is described a relationship between magnetic flux, voltage, current, torque and power of the AC motor according to the present embodiment. FIG. 16 is a vector diagram showing the relationship between the voltage, current and power of the AC motor according to the present embodiment. In FIG. 16, the X axis represents a real axis and Y axis represents an imaginary axis, wherein the angle in the counterclockwise direction with respect to the X axis (CCW direction) is indicative of a phase angle. Rates of changes in rotation angles (hereinafter, referred to as "rotation angle changing rate(s)") of flux φp and φq, which pass through the P-phase stator-side neutral poles 15, 18, and the Q-phase stator-side neutral poles 19, 22 and interlink the P-phase winding 23 and the Q-phase winding 24, are referred to unit voltages Ep, Eq, and thus equations Ep=dφp/dθ and Eq=dφq/dθ should be established, where θ indicates a rotational angle of the rotor 100 in terms of a mechanical angle. Positions of the stator poles of the individual phases relative to the permanent magnet 13 or 14 are shifted, as shown in FIG. 3, by 90 electrical degrees at a time. Accordingly, the unit voltages Ep, Eq induced per one turn of the windings 23, 24 of the individual phases result in two-phase AC voltage as shown in the vector diagram of FIG. 16. Further, since Ep, Eq are principally in proportion to the number of poles, larger torque may be obtained by providing a larger multipolarization structure than the eight-pole structure shown in FIG. 1.

Assuming that rotation is made at a constant rotation of dθ/dt=S1, the number of winding times of the windings 23, 24 are Wp, Wq, respectively, with their values being equal to Wc, the induced voltages Vp, Vq are expressed as follows:

$$Vp = Wp \times (d\phi p / dt) \quad (1)$$
$$= Wp \times d\phi p / d\theta \times d\theta / dt$$
$$= Wp \times Ep \times S1$$

$$Vq = Wq \times Eq \times S1 \quad (2)$$

Referring to a specific relationship between the winding and the voltage, the unit voltage Eq of the P phase is the voltage generated per one turn of the P-phase winding 23, and the unit voltage Eq of the Q phase is the voltage generated per one turn of the Q-phase winding 24 shown in FIGS. 1 and 4.

If the torque of the AC motor 1 is to be efficiently generated, currents Ip, Iq of the respective phases should be flowed in the same phases as the voltages. Ep, Eq across the respective phase windings, so that the power factor should result in "1". Thus, FIG. 16 shows a case where, for example, the currents Ip, Iq fall in the same phases as the unit voltages Ep, Eq, respectively.

Powers Pp, Pq of the individual phases and an output power Pa of the AC motor are expressed as follows:

$$Pp = Vp \times Ip = Wp \times Ep \times S1 \times Ip \quad (3)$$

$$Pq = Vq \times Iq = Wq \times Eq \times S1 \times Iq \quad (4)$$

$$Pa = Pp + Pq = Vp \times Ip + Vq \times Iq \quad (5)$$

Torques Tp, Tq of the individual phases and a torque Ta of the AC motor are expressed as follows:

$$Tp = Pp/S1 = Wp \times Ep \times Ip \quad (6)$$

$$Tq = Pq/S1 = Wq \times Eq \times Iq \quad (7)$$
$$Ta = Tp + Tq = Wq \times Ep \times Ip + Wq \times Eq \times Iq$$
$$= Wc \times (Ep \times Ip + Eq \times Iq) \quad (8)$$

Discussion should now be directed to various amounts, on the assumption that, as a specific example, the number of poles of the AC motor is 8, and that the flux distribution of the rotor 100 is of an ideal sine wave distribution, and on further assumption that the P-phase flux φp and the Q-phase flux φq are the two phase flux having a phase difference of 90 degrees in an electrical angle, and that φp=φo×sin(8/2×θ) and φq=−φo×cos(8/2×θ). Then, the voltages of the windings are expressed by: Ep=dφp/dθ=4φo×cos(4θ), and Eq=dφq/dθ=4φo×sin(4θ). Calculation using the formulae (1) and (2) results in as follows:

$$Vp = Wp \times Ep \times S1 = Wp \times 4\phi o \times \cos(4\theta) \times S1$$

$$Vq = Wq \times 4\phi o \times \sin(4\theta) \times S1$$

where, φo is an amplitude of flux. Thus, Vp, Vq result in two-phase AC voltages having a phase difference of 90 degrees in electrical angle.

Provided that the current Ip=Io cos(4θ), and the current Iq=Io sin(4θ), calculation of powers using the formulae (3) and (4) results in as follows:

$$Pp = Vp \times Ip$$
$$= Wp \times 4\phi o \cos(4\theta) \times S1 \times Io\cos(4\theta)$$
$$= 4Wp \cdot \phi o \cdot S1 \cdot Io\cos 2(4\theta)$$

$$Pq = Vq \times Iq$$
$$= 4Wq \cdot \phi o \cdot S1 \cdot Io\sin s2(4\theta)$$

$$Pa = Pp + Pq$$
$$= Vp \times Ip + Vq \times Iq$$
$$= 4Wp \cdot \phi o \cdot S1 \cdot Io$$

The output torque Ta of the AC motor according to the present embodiment results can be shown by Ta=4Wp·φo·Io as derived from the formula (8). Accordingly, the output torque Ta results in a constant value, and the output Pq results in a constant value in proportion to the rotational speed S1.

In the AC motor according to the present embodiment shown in FIG. 1, description has been made for the case where the phase difference between the P phase and the Q phase is 90 degrees in electrical angle. However, even when the phase difference is not 90 degrees, the torque Ta having small torque ripples may be ensured by appropriately selecting the amplitudes and phases of the currents Ip, Iq, and the number of winding times Wp, Wq of the windings 23, 24 of the individual phases.

As described with reference to FIGS. 14 and 15, the characteristics of the AC motor 1 according to the present embodiment reside in that dφp/dφ in the formula (1) described above can be made larger comparing with the AC motor of a conventional structure shown in FIG. 51, because the flux linkage φp, φq to the windings 23, 24 of the individual phases can be made larger. Accordingly, high torque, high efficiency and reduced size can be attained with the same amount of current.

(Various Modifications)

Various modifications of the AC motor 1 according to the above embodiment will now be described, in which the shapes and structures of the motor are developed further.

(First Modification)

Figure 17:
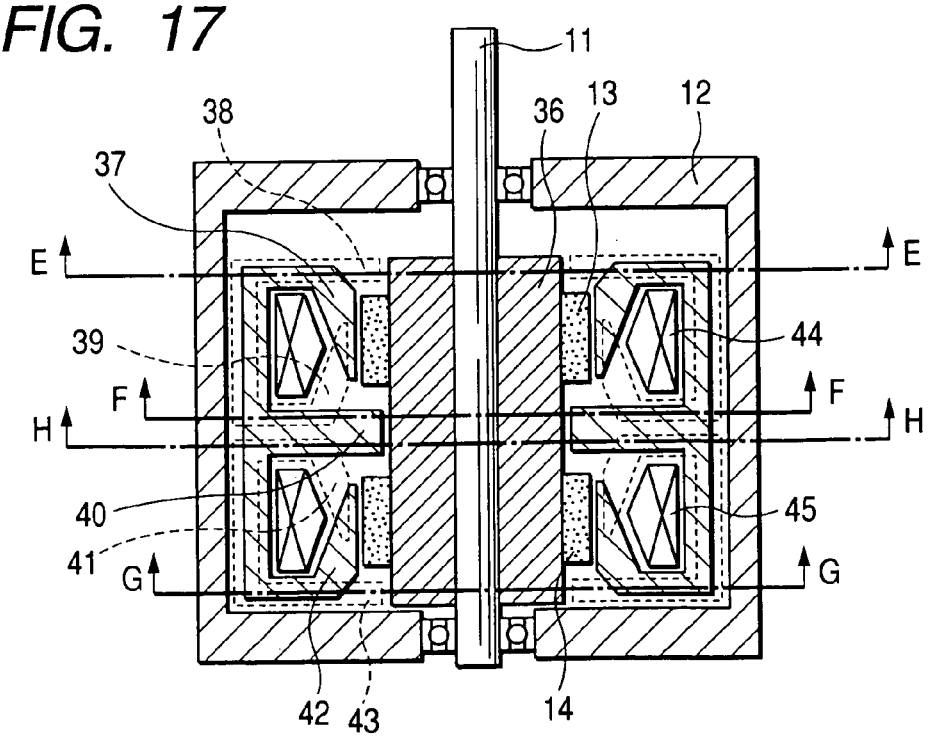
FIG. 17 is a vertical cross section of a modified AC motor wherein the shapes of stator poles and stator-side neutral poles have been improved.

FIG. 17 is a vertical cross section of a modification of the AC motor, in which the shapes of the stator poles and the stator-side neutral poles are improved. In the AC motor 1 shown in FIG. 1, the stator poles and the stator-side neutral poles of the individual phases are located so that the magnetic circuits extending from the outer periphery of the stator to the air gap between the stator 200 and the rotor 100 are formed at different positions in the direction along the rotor shaft 11. Therefore, the length of the motor is so much the larger. Contrarily, in the modified AC motor shown in FIG. 17, the magnetic circuits extending from the outermost diameter of the stator having P-phase stator poles 37 and a P-phase stator-side neutral pole 38 to the air gap, are formed at the same position in the axial direction of the rotor. In short, the magnetic circuits are formed on the same circumference so that the length along the rotor shaft 11 may be so much the smaller. Similarly, the magnetic circuits extending from the outermost diameter of the stator having Q-phase stator poles 42 and a Q-phase stator-side neutral pole 43 to the air gap are formed at the same position in the axial direction of the rotor. In short, the magnetic circuits are located on the same circumference so that the length along the rotor shaft 11 may be so much the smaller. Further, comparing the modification with the structure shown in FIG. 1, a stator-side neutral pole 40 at the central portion of the motor takes a form in which the two stator-side neutral poles, i.e. poles 18, 19 are magnetically aggregated into one, and is located at the same position as that of stator poles 39, 41 in the axial direction of the rotor. Thus, the length along the rotor shaft 11 may be made so much the further smaller.

Figure 18:
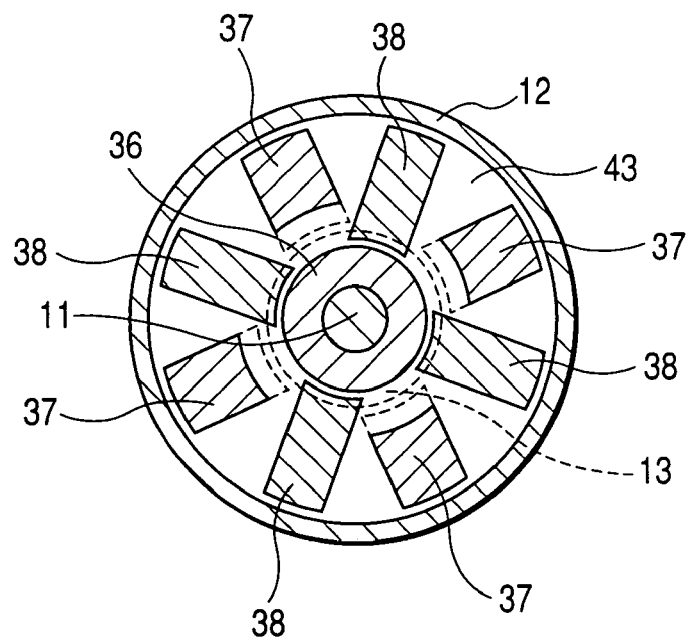
FIG. 18 is a cross section taken along an E-E line of FIG. 17.
Figure 19:
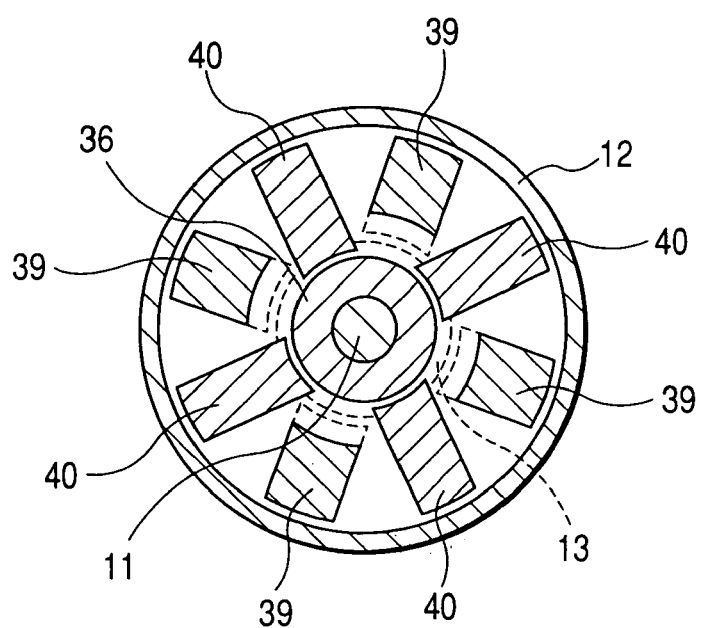
FIG. 19 is a cross section taken along an F-F line of FIG. 17.
Figure 20:
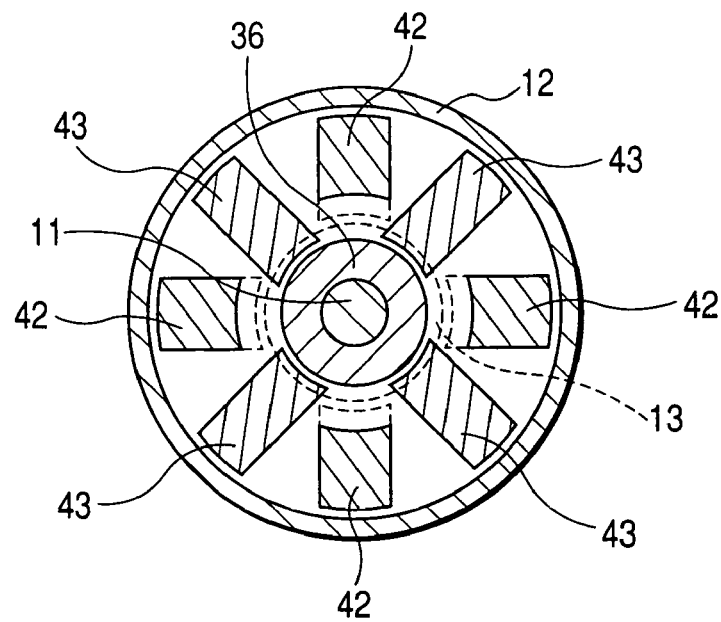
FIG. 20 is a cross section taken along a G-G line of FIG. 17.
Figure 21:
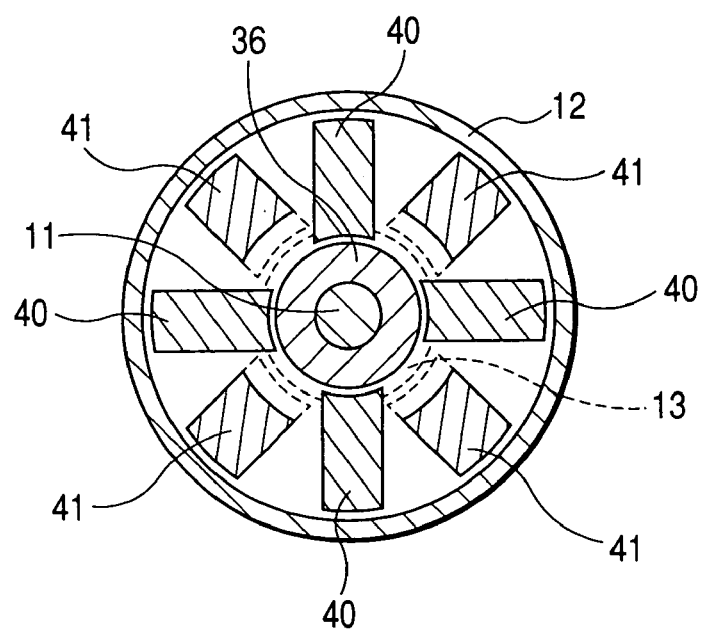
FIG. 21 is a cross section taken along an H-H line of FIG. 17.

The basic functions and operations of the individual portions of the AC motor shown in FIG. 17 are the same as those shown in FIG. 1, except that the magnetic path structure of the stator has been altered. FIG. 18 is a cross section taken along an E-E line of FIG. 17, in which cross sectional shapes of the P-phase stator poles 37 of forward direction and the P-phase stator-side neutral poles 38 of reverse direction are illustrated. FIG. 19 is a cross section taken along an F-F line of FIG. 17, in which cross sectional shapes of the P-phase stator poles 39 of reverse direction and the P-phase stator-side neutral poles 40 of forward direction are illustrated. FIG. 20 is a cross section taken along a G-G line of FIG. 17, in which cross sectional shapes of the Q-phase stators 42 of forward direction and the Q-phase stator-side neutral poles 43 of reverse direction are illustrated. FIG. 21 is a cross section taken along an H-H line of FIG. 17, in which cross sectional shapes of the Q-phase stator poles 41 of reverse direction and the Q-phase stator-side neutral poles 40 in forward direction are illustrated. It should be appreciated that the P-phase stator-side neutral poles 40 of forward direction and the Q-phase stator-side neutral poles 40 of forward direction are allowed to be in common on the assumption that the magnetic resistance between itself and the rotor-side neutral pole 36 is sufficiently small so as not to cause any problem in the operation of the magnetic circuits of the AC motor. The stator-side neutral poles 38, 40, 43 shown in FIGS. 18 to 21, respectively, are annularly connected with each other at the side of the inner periphery, as shown by the broken lines, to increase the area opposed to the rotor-side neutral pole, so that the magnetic resistance may be reduced.

(Second Modification)

Two-phase AC motors, each consisting of a P phase and a Q phase, have been described with reference to FIGS. 1 to 21. The similar concept may be applied to an N-phase AC motor (N is more than 2) by providing the N number of modules (actuators) for the respective phases.

Specifically, the structure illustrated in FIG. 1 includes two-phase AC motor, and thus the motor includes two actuators whose phase difference is 90 degrees. In this regard, by providing the N number of actuators in the axial direction and by relatively offsetting the phases from each other by 360/N degrees in electrical angle, an N-phase AC motor may be structured.

As shown in FIG. 17, in case a composite construction part of which is made composite, the composite components may be serially arranged in the axial direction, while offsetting the phases by the electrical angle of 360/N, whereby an N-phase AC motor may be constituted. In this connection, however, the structure must be so arranged that it would not produce flux components for magnetic paths other than the ones produced by the configuration shown in FIG. 17. Accordingly, in order to eliminate the flux between the composite components described above, it is necessary to provide a magnetic isolation so as either not to connect the magnetic paths between the composite components in a stator or not to connect the magnetic paths between the composite components in a rotor.

(Third Modification)

In the AC motor described above referring such as to FIG. 1, a principal torque constant, i.e. an output torque which is obtained by passing the same current through the same winding, may be increased by multipolarization. However, the multipolarization arises a problem that the distance between the individual stator poles is shortened to thereby increase leakage flux from between the individual stator poles. Such an increase in the leakage flux between poles causes reduction of flux which is effective in generating torque, thereby reducing generation of torque and reducing power factors, and thus ultimately reducing efficiency. The increase also causes excessive torque ripples, vibration or noise.

FIGS. 22 to 25 show transverse cross sections of an AC motor for reducing leakage flux between stator poles. These figures illustrate a structure in which the number of poles is increased to 16. FIGS. 22 to 25 show, respectively, the configurations corresponding to the E-E line cross section, the F-F line cross section, the G-G line cross section and the H-H line cross section of FIG. 17, although the number of the poles and stator structure are different.

Figure 22:
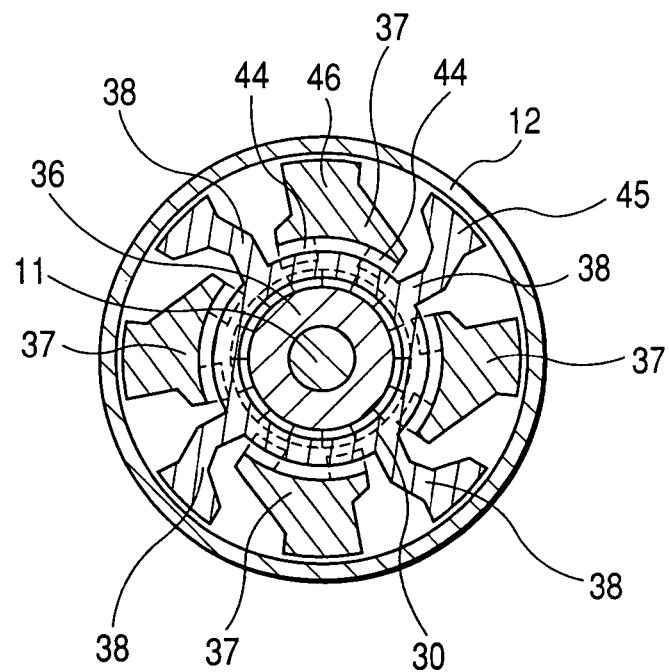
FIG. 22 is a transverse cross section of a motor structure for decreasing leakage flux between different stator poles.

In FIG. 22, a 16-pole permanent magnet 30 which does not appear in the cross section is shown by a broken line. P-phase stator poles 37 in forward direction are disposed opposed to the permanent magnet 30 of the rotor, with their tip portions 44, which do not appear in the cross section, being also shown by broken lines. Two tip portions 44 of each of the stator poles 37 are magnetically aggregated and connected to the magnetic circuit of the back yoke. P-phase stator-side neutral poles 38 of reverse direction are disposed opposed to a rotor-side neutral pole 36 and are annularly coupled to each other at the inner peripheral portion of the stator.

Figure 23:
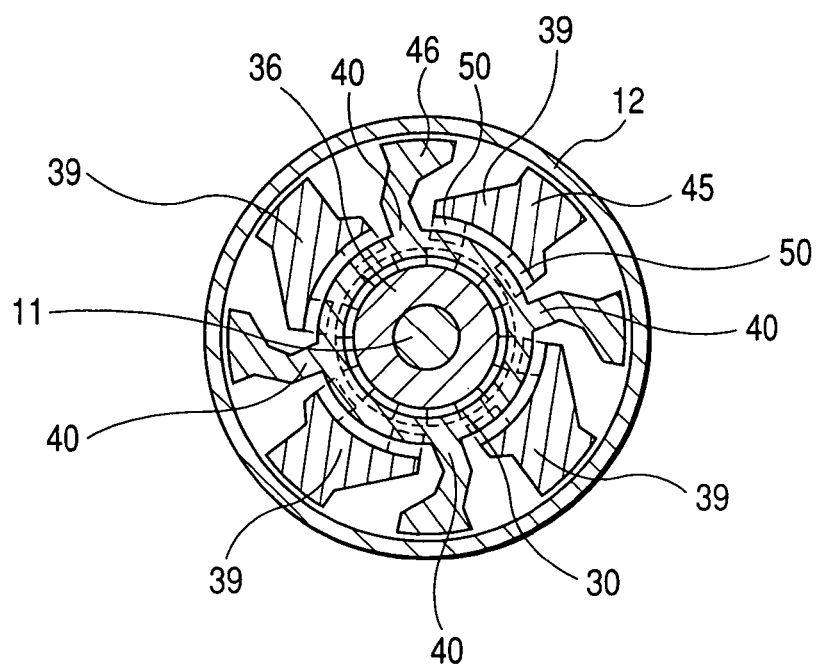
FIG. 23 is a transverse cross section of a motor structure for decreasing leakage flux between different stator poles.

In FIG. 23, tip portions 50 of each of the P-phase stator poles 39 in reverse direction, which are disposed opposed to the permanent magnet 30 of the rotor, are shown by broken lines since they do not appear in the cross section. Two tip portions 50 of each of the stator poles 39 are magnetically aggregated and connected to the magnetic circuit of the back yoke. The P-phase stator-side neutral poles 40 in forward direction, which are opposed to the rotor-side neutral pole 36, are annularly coupled at the inner peripheral portion of the stator.

Referring to the flux that passes through the stator pole 37, such flux emitted from the permanent magnet 30 passes through the polar tip portions 44, the stator pole 37, a magnetic circuit 46 in the vicinity of the outer circumference of the stator, the stator-side neutral pole 40 and returns to the rotor-side neutral pole 36. The magnetic circuit 46 is connected in the axial direction of the rotor, extending from the cross sectional portion shown in FIG. 22 to the cross sectional portion shown in FIG. 23. Referring to the flux that passes through the stator-side neutral pole 38, the flux emitted from the permanent magnet 30 passes through the polar tip portions 50, the stator pole 39, a magnetic circuit 45 in the vicinity of the outer circumference of the stator, the stator-side neutral pole 38, and returns to the rotor-side neutral pole 36. The magnetic circuit 45 is connected in the axial direction of the rotor, extending from the cross sectional portion shown in FIG. 22 to the cross sectional portion shown in FIG. 23.

Figure 24:
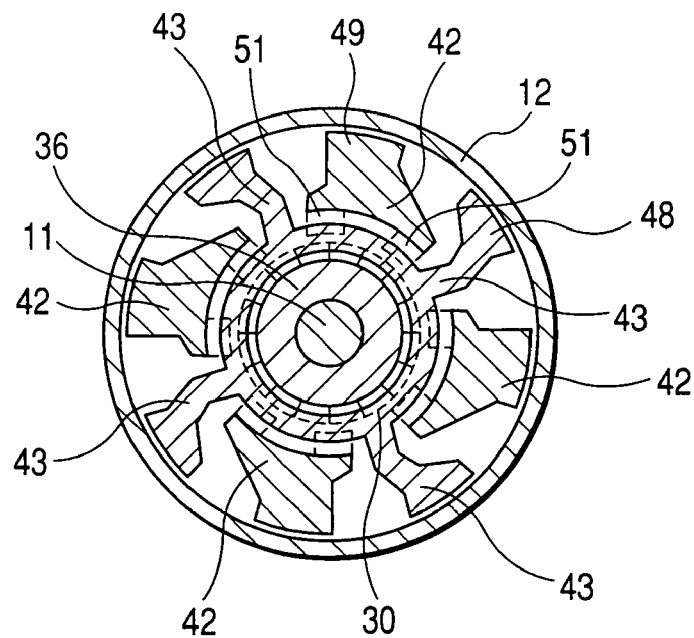
FIG. 24 is a transverse cross section of a motor structure for decreasing leakage flux between different stator poles.

In FIG. 24, the 16-pole permanent magnet 30 which does not appear in the cross section is shown by a broken line. Q-phase stator poles 42 in forward direction are disposed opposed to the permanent magnet 30 of the rotor, with their tip portions 51, which do not appear in the cross section, also being shown by broken lines. Two tip portions 52 of the stator poles 42 are magnetically aggregated and connected to the magnetic circuit of the back yoke. Q-phase stator-side neutral poles 43 in reverse direction are disposed opposed to the rotor-side neutral pole 36 and are annularly coupled to each other at the inner peripheral portion of the stator.

Figure 25:
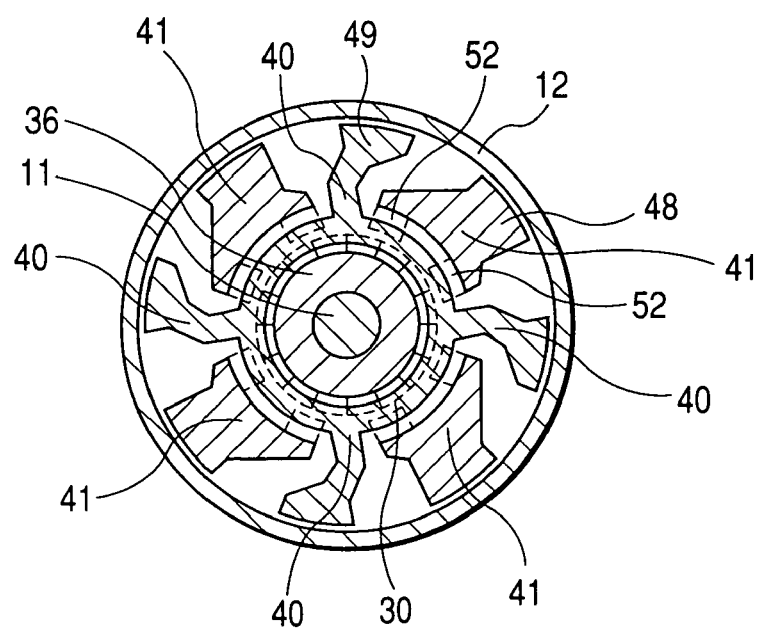
FIG. 25 is a transverse cross section of a motor structure for decreasing leakage flux between different stator poles.

In FIG. 25, tip portions 52 of the Q-phase stator poles 41 in reverse direction, which are disposed opposed to the permanent magnet 30 of the rotor, are shown by broken lines since they do not appear in the cross section. Two tip portions 52 of the stator poles 41 are magnetically aggregated and connected to the magnetic circuit of the back yoke. The Q-phase stator-side neutral poles 40 in forward direction, which are opposed to the rotor-side neutral pole 36, are annularly coupled at the inner peripheral portion of the stator. The stator-side neutral poles 40 are the integration of the P-phase and the P-phase stator-side neutral poles in forward direction.

Referring to the flux that passes through the stator poles 42, the flux emitted from the permanent magnet 30 passes through the polar tip portions 51, the stator pole 42, a magnetic circuit 49 in the vicinity of the outer circumference of the stator, the stator-side neutral pole 40 and returns to the rotor-side neutral pole 36. The magnetic circuit 49 is connected in the axial direction of the rotor, extending from the cross sectional portion shown in FIG. 24 to the cross sectional portion shown in FIG. 25. Referring to the flux that passes through the stator-side neutral pole 43, the flux emitted from the permanent magnet 30 passes through the polar tip portions 52, the stator pole 41, a magnetic circuit 48 in the vicinity of the outer circumference of the stator, the stator-side neutral pole 43, and returns to the rotor-side neutral pole 36. The magnetic circuit 48 is connected in the axial direction of the rotor, extending from the cross sectional portion shown in FIG. 24 to the cross sectional portion shown in FIG. 25.

The structure illustrated in FIGS. 22 to 25 is characterized by the magnetic aggregation for integration of the two tip polar portions 44 into the common stator pole 37 and the magnetic circuit 46. Such an magnetic aggregation may allow reduction in the number of the magnetic circuits, and thus the distance between adjacent magnetic circuits is made so much the larger, so that an effect of reducing leakage flux from between poles can be obtained. As a result, the power factor is improved, and thus an effect of increasing torque can be attained. Three or more number of polar tip portions may be magnetically aggregated in stator poles.

The stator-side neutral poles 38 are annularly coupled to each other at the inner peripheral portion of the stator so as to increase the facing area at the gap between the rotor-side neutral pole and the stator-side neutral poles, so that an effect of reducing magnetic resistance at the gap can be obtained. As to the magnetic circuit extending from the cross sectional portion shown in FIG. 22 to the cross sectional portion shown in FIG. 23, various modifications can be made, such as the use of spaces positioned in the axial direction of the rotor, being offset from these cross sectional portions, or the use of the motor case 12 as a portion of the magnetic circuit. Further, although the manner of aggregation in the stator pole is different from the manner of aggregation in the stator-side neutral pole, the two manners may be mixed together.

(Fourth Modification)

Figure 26:
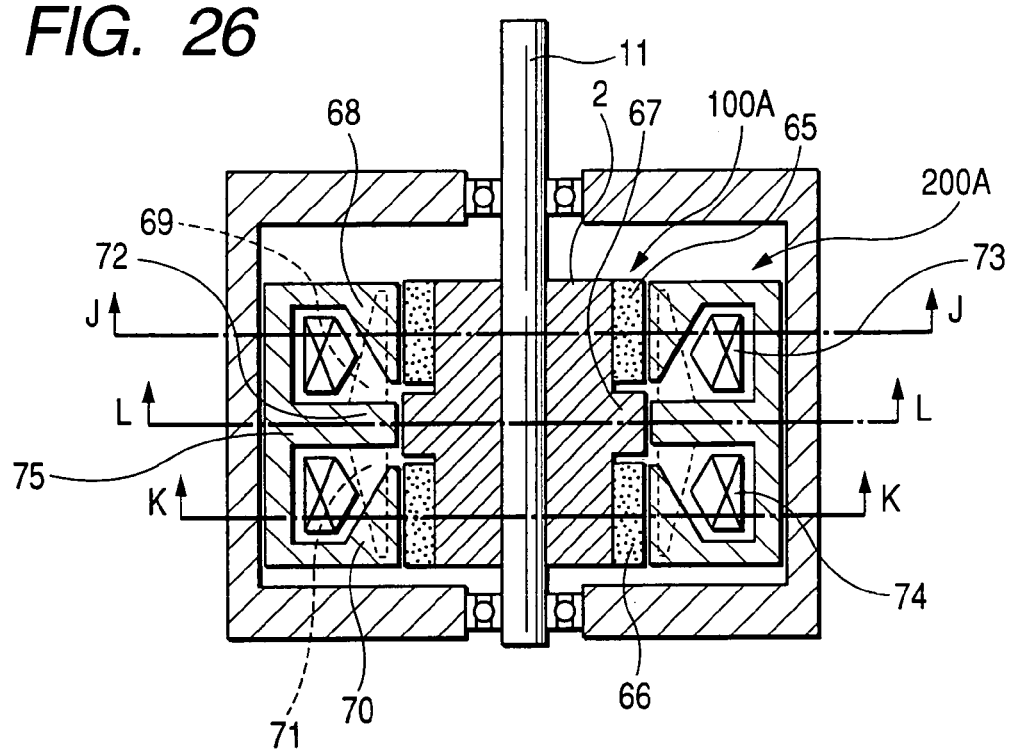
FIG. 26 is a vertical cross section showing a modified AC motor.

FIG. 26 is a vertical cross section of a modification, i.e. a two-phase and eight-pole AC motor consisting of the P phase and the Q phase. A rotor 100A comprises a P-phase permanent magnet 65, a Q-phase permanent magnet 66 and the back yoke 2. A portion of the back yoke operates as a rotor-side neutral pole 67. The surface profile of the rotor linearly expanded in a circumferential direction is the same as the one shown in FIG. 2 with the exception that the rotor-side neutral poles 25 and 27 at the opposite ends are removed in the present modification.

A stator 200A comprises a P-phase winding 73, a Q-phase winding 74, P-phase stator poles 68, 69, Q-phase stator poles 70, 71, and a stator-side neutral pole 72. Both of the P-phase winding 73 and the Q-phase winding 74 have a loop shape, the linear expansion of which in the circumferential direction results in as shown in FIG. 4.

The P-phase stator poles 68 in forward direction are disposed opposed to the permanent magnet 65. The P-phase stator-side neutral pole 72 is for directing a flux F1 that passes the stator pole 68 so as to interlink the P-phase winding 73, and is disposed opposed to the rotor-side neutral pole 67.

The Q-phase stator poles 70 in forward direction are disposed opposed to the permanent magnet 66. The Q-phase stator-side neutral pole 72 is for directing a flux F3 that passes the stator pole 70 so as to interlink the Q-phase winding 74, and is disposed opposed to the rotor-side neutral pole 67. The stator-side neutral pole 72 serves both as the P-phase stator-side neutral pole and the Q-phase stator-side neutral pole. The shape of an end portion at the air gap side of the stator-side neutral pole 72 may be made larger, for example, so that the area that faces the rotor 100A may be increased to reduce the magnetic resistance. The AC motor illustrated in FIG. 26 may increase torque because of its simplified stator structure and the resulting larger facing area of the stator poles toward the rotor.

Figure 27:
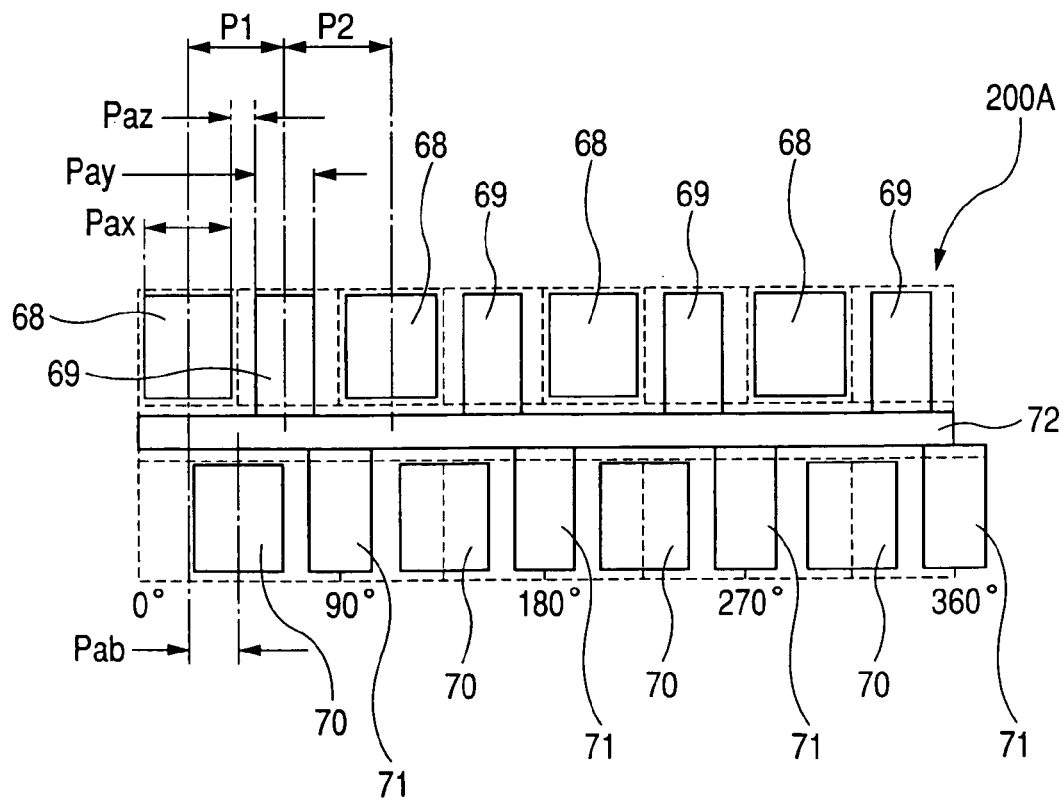
FIG. 27 is a linear expansion plan of an inner periphery of a stator along the direction of rotation.

FIG. 27 is a linear expansion plan of the inner peripheral surface of the stator 200A along the direction of rotation. The horizontal axis indicates rotational angles in terms of a mechanical angle, in which 360 degrees mean one rotation. The positions of the Q-phase stator poles 70 relative to the P-phase stator poles 68 are offset by a phase difference Pab which is 22.5 degrees in mechanical angle, i.e. 90 degrees in electrical angle. The phase difference between the stator poles in the same phase is the sum total of P1 and P2, which is 90 degrees in mechanical angle, i.e. 360 degrees in electrical angle.

The stator poles 69, 71 shown by broken lines in FIG. 26 are the stator poles in reverse direction for absorbing reverse flux of the Q-phase stator poles 68 and the Q-phase stator poles 70, respectively, and are magnetically connected to the stator-side neutral pole 72. The AC motor functions if the reverse stator poles 69, 71 are omitted. Thus, by eliminating the stator poles 69, 71, the stator structure may be simplified, while readily increasing the number of winding times of the P-phase winding 73 and the Q-phase winding 74 or simplifying the whole structure.

Contrarily, by increasing the number of the stator poles 69, 71, unnecessary flux components on the surface of the rotor, which do not pass through the stator poles 68, 70 may be absorbed to thereby increase generation of torque of the AC motor, although it depends on the rotor structure or magnetic characteristics of the rotor. Because the primary function of these stator poles 69, 71 is to absorb or remove harmful flux that leaks out to the stator poles 68, 70, the stator poles 69, 71 may not necessarily be disposed close to the surface of the rotor. If the length of the air gap along the stator poles 69, 71 is made larger than that along the stator poles 68, 70, deterioration of motor characteristics may hardly occur. The shape of the stator poles 69, 71 may be a simplified one, such as a shape of a rod. By placing stator poles 69, 71 of such a simplified shape close to the stator poles 68, 70, the harmful flux may be absorbed or removed.

In the relationship between the shape of the stator poles and the motor characteristics in the AC motor shown in FIGS. 26 and 27, requirements for improving the motor characteristics, in particular, are as follows:

(I) to allow a flux N1 that passes from the permanent magnet 65 to the P-phase stator poles 68 to increase as much as possible, and to allow a flux N3 that passes from the permanent magnet 66 to the Q-phase stator poles 70 to increase as much as possible to increase the torque constant of each of the windings; and (II) to decrease leakage flux as much as possible, i.e. the leakage flux that passes directly from the P-phase stator poles 68 to the reverse-phase stator-side neutral poles 69 or to the stator-side neutral pole 72 without passing the permanent magnet 65, which does not contribute to generating torque, and in this sense is harmful because it causes deterioration in power factor.

According to the requirements (I) and (II) described above, a width Pax of the stator pole 68 in forward direction shown in FIG. 27 should be a little wider, so that as much a flux as possible can pass therethrough from the permanent magnet 65 of the same phase in the rotor 100A. On the other hand, the distance between the forward stator pole 68 and the reverse stator-side neutral pole 69 should be made as large as possible, so that as less a leakage flux as possible may occur between the poles. Consequently, a large overall torque may be generated if the polar width Pax of the forward stator pole 68 is a little smaller than 180 degrees in electrical angle, and if a polar width Pay of the reverse stator-side neutral pole 69 is smaller than the width Pax by 0 to 40%. This concept is prominent when the number of poles of an AC motor are increased, and when the thicknesses of the permanent magnets 65, 66 are sufficiently large so that the flux passing respective portions are substantially in proportion to the magnet area opposed to the permanent magnets to enable generation of a large magnetomotive force.

Figure 28:
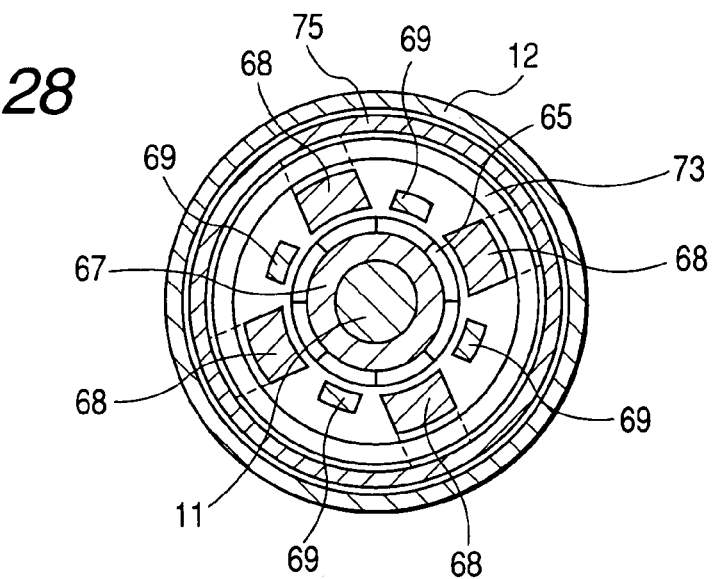
FIG. 28 is a cross section taken along a J-J line of FIG. 26.
Figure 29:
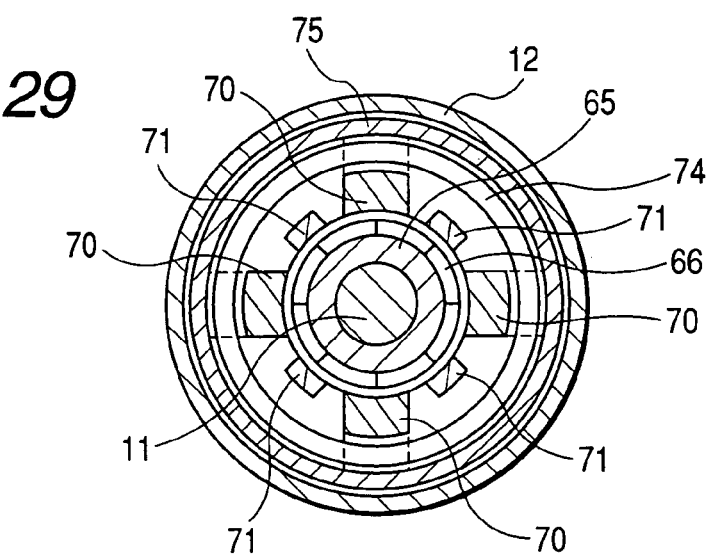
FIG. 29 is a cross section taken along a K-K line of FIG. 26.
Figure 30:
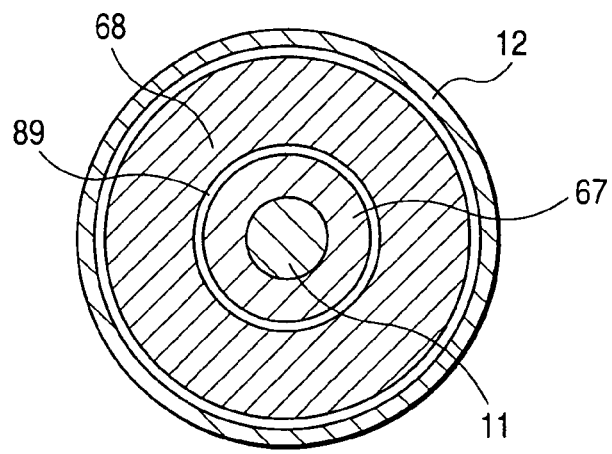
FIG. 30 is a cross section taken along an L-L line of FIG. 26.

FIG. 28 is a cross section taken along a J-J line of FIG. 26. FIG. 29 is a cross section of a K-K line of FIG. 26. FIG. 30 is a cross section taken along an L-L line of FIG. 26.

Figure 31:
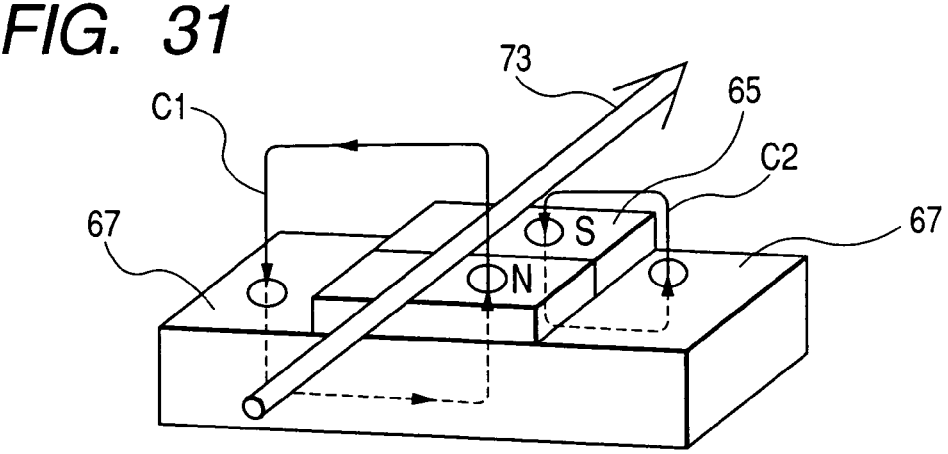
FIG. 31 illustrates a model of flux linkage to a winding of a modified AC motor.
Figure 51:
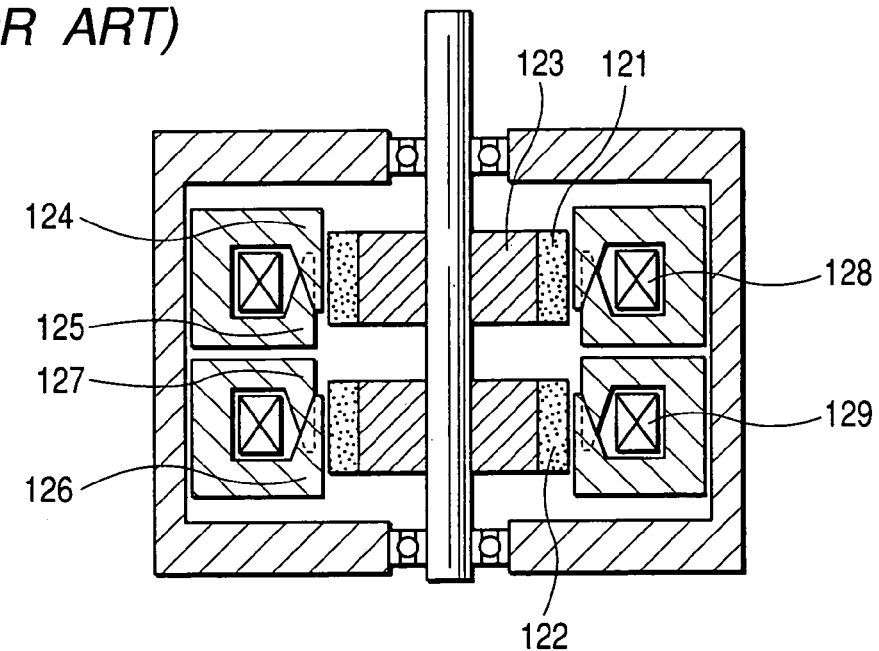
FIG. 51 is a cross section showing a configuration of a conventional two-phase stepping motor.
Figure 52:
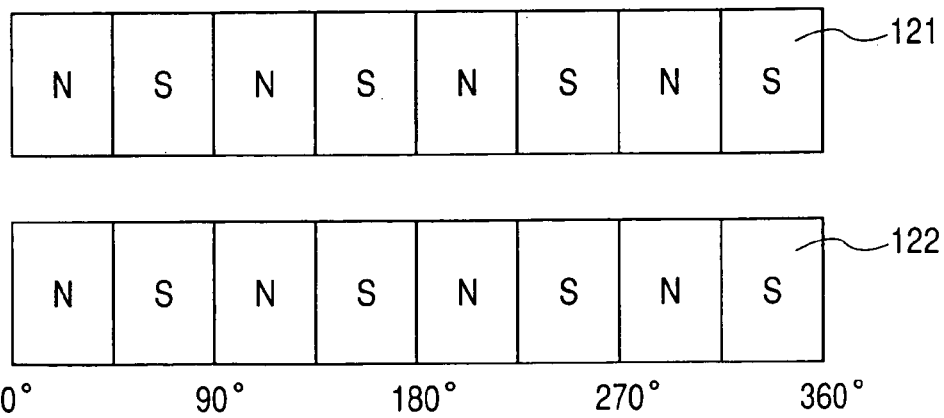
FIG. 52 is a circumferential expansion plan of the permanent magnet provided in a rotor of the two-phase stepping motor shown in FIG. 51.
Figure 53:
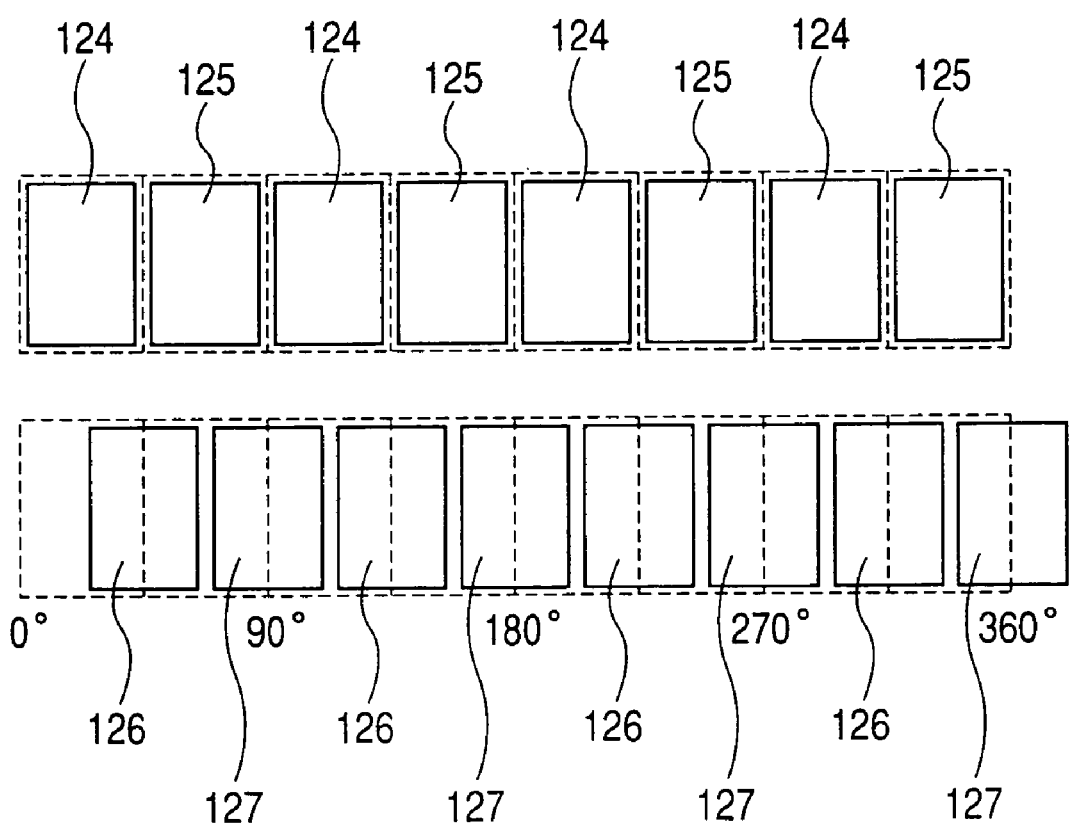
FIG. 53 is a circumferential expansion plan of the stator poles of the two-phase stepping motor shown in FIG. 51.

The magnetic operation of the AC motor illustrated in FIG. 26 is described comparing with the conventional AC motor illustrated in FIG. 51. Reference is made to a flux that interlinks the P-phase winding 128 as one element of the AC motor, by focusing on only one combination of the stator poles 124, 125 and a pair of the N pole and S pole of the permanent magnet 121 of the AC motor of the conventional structure. In this case, the flux may be typically illustrated as shown in FIG. 14. Similarly, FIG. 31 typically illustrates the AC motor shown in FIG. 26. In FIG. 31, a flux C1 that interlinks the winding 73 uses only one of the N pole and S pole of the permanent magnet 65, and a remaining flux C2 is ensured not to interlink the winding 73 owing to the stator-side neutral pole 69.

Comparison is now made between the magnitudes of the flux A shown in FIG. 14 and the flux C1 shown in FIG. 31. As to the flux density, the flux A is more advantageous (larger) in that the magnetic power of both the N pole and the S pole is effectively utilized. However, utilization of a rare earth magnet of high performance, i.e. a sufficiently thick permanent magnet, may enable a design in which the flux densities of the flux A and the flux C1 make a little difference. As to the area of the flux, as the more number of poles are employed to an AC motor, the larger the distance is required to be between the stator poles 124 and 125 in order to reduce the leakage flux between the poles. As a result, the magnet facing area of the stator poles 124, 125 shown in FIG. 51, is obliged to be small. On the other hand, the magnet facing area of the stator poles 68 shown in FIG. 26 may be made larger with an optimum shape that matches the size of the permanent magnet 65, since the shape of the adjacent stator-side neutral poles 69 may be made smaller to increase the distance between poles. Consequently, the AC motor shown in FIG. 26 may be permitted to have a larger torque constant than the AC motor of the conventional structure shown in FIG. 51 to thereby realize high torque, small size and low costs, although it may depend on the number of poles in the AC motor.

In FIG. 27, the stator poles 68, 70 and 69, 71 at the air gap side are in rectangular shape to simply and typically illustrate the principle. However, the shape of the stator poles may be variously modified by skewing, or by making them to be elliptic, or by removing some corners of the poles for the purposes of reducing leakage flux between adjacent poles or reducing torque ripples, whereby cogging torque and torque ripples can be reduced.

Although a two-phase motor having the P phase and the Q phase has been described with respect to the AC motor shown in FIG. 26, an N-phase AC motor (N is more than 2) having N number of modules (actuators) for the individual phases, may be implemented by applying the similar concept.

(Fifth Modification)

The structuring technique is described hereunder with respect to the magnetic circuits of the AC motors illustrated, such as in FIGS. 1, 17 and 26.

In these AC motors, since flux which are directed from the stator poles in one phase to the stator poles in the other phases are produced, such flux are also directed to the rotor shaft 11. As a result, the flux is directed in three-dimensional directions, i.e. in the axial direction of the rotor, in radial direction, and in circumferential direction. In case of a stacked structure of magnetic steel sheets, which has been mainly used conventionally, many magnetic circuits have been designed, so that the magnetic paths are directed in two-dimensional directions, and that formation of the flux in the stacking direction of the magnetic steel sheets can be avoided as much as possible in order to reduce eddy current. In the AC motor of the present embodiment, a magnetic circuit may be constituted in three-dimensional directions without causing excessive eddy current, by structuring all or portions of the stator and the rotor by press molding of soft magnetic metal powder material. Thus, a three dimensional magnetic circuit which hardly causes loss may be structured. The soft magnetic metal powder material is obtained by forming a film of large electrical resistance on the surface of ferromagnetic powder, followed by solidification of the resultant by press molding by using metal mold or the like. In particular, by providing a nearly final shape by press molding using a metal mold, a finally shaped stator magnetic circuit and a rotor magnetic circuit may be manufactured by eliminating or reducing mechanical cutting. Thus, a magnetic circuit of three-dimensional structure can be readily constituted, and even a complex shape may be comparatively readily constituted. Accordingly, manufacturing costs may be reduced.

A particular example of readily constituting a stator structure is to separate the stator 200 in the direction orthogonal to the axial direction of the rotor shaft 11 at the vicinity of an opening of a slot located intermediate of the A-A line cross section and the B-B line cross section, for insertion afterward of a loop winding 23 that has been wound outside the motor. Alternatively, the winding 23 may be directly wound around the separated piece of stator core. The separated pieces of stator core may each be provided with a matching plane to readily enable precise assembling. Alternatively, a hole, a recess, a projection or the like may be provided to the pieces of stator core to readily enable attachment of members, such as a pin for assembling. As a useful scheme, the stator core may also be separated intermediate between the D-D line cross section and the C-C line cross section for the sake of convenience for inserting the winding 24, and may then be assembled. The position and shape of a plane for separating each of the stator and the rotor may be appropriately determined considering the easiness of press molding, the easiness of assembly or the like.

As a method of constituting a magnetic circuit of a stator, each of the stator poles and a stator back yoke may be formed by pressing and punching a metal plate for making a shape, followed by folding.

(Sixth Modification)

Another effective method for improving, such as a stator, is to use both the soft magnetic metal powder material and the magnetic steel sheets, by which characteristics of both of the materials may be exerted in the magnetic characteristics and in the strength. A magnetic member obtained by forming the soft magnetic metal powder material by high-pressure pressing, followed by heating, is characterized by the freedom of directionality of flux. However, the maximum flux density of such a member is low comparing with that attained by the magnetic steel sheets, so that such a problem as large iron loss may be caused, particularly, in a region of high magnetic flux density.

A magnetic member fabricated by using the soft magnetic metal powder material and a magnetic member fabricated by using the magnetic steel sheets may be combined. However, the soft magnetic metal powder material and the magnetic steel sheets may rather be simultaneously formed by high-pressure pressing for integration. The latter method is more advantageous from the viewpoints of efficient manufacture, improvement in the adhesion of both of the members, strength of the magnetic members, and precision of the shapes after pressing of the magnetic members. In particular, if a directional silicon steel plate is used as a magnetic steel plate in a direction that a flux effects in an AC motor, high magnetic flux density and high rate of magnetic induction are obtained. Thus, by effectively utilizing characteristics of both of the members, problems that reside in each of the member may be compensated.

As far as the strength is concerned, the magnetic member fabricated by press molding the soft magnetic metal powder material may cause a weakness problem. Thus, it may be advantageous to use the magnetic steel sheets for a narrowed portion, for example, at a tip portion of a stator pole. In this way, such composite magnetic members may be located so that they may be best used depending on the characteristics required in each of the portions.

(Seventh Modification)

A two-phase AC winding has more simplified structure than a three-phase AC winding because of the less number of phases. However, a two-phase AC motor rather has more number of transistors at a power inverter in the control device than a three-phase AC motor. This makes a two-phase AC motor disadvantageous in respect of the space for the control device and of costs. Usually, the number of transistors in a three-phase AC inverter is six. On the other hand, in a two-phase AC inverter, the sum of the values of current passing through the two phases is constantly not zero to make the configuration slightly complicated. For example, in a two-phase AC inverter, four transistors control a single reciprocal current, and thus, currents of the two phases are controlled by using eight transistors. Thus, if three-phase currents can be transferred to two-phase currents apparently by contriving a motor winding, the costs of the control device can be reduced so that the overall costs are reduced, although the motor winding may become a little complicated.

Figure 32:
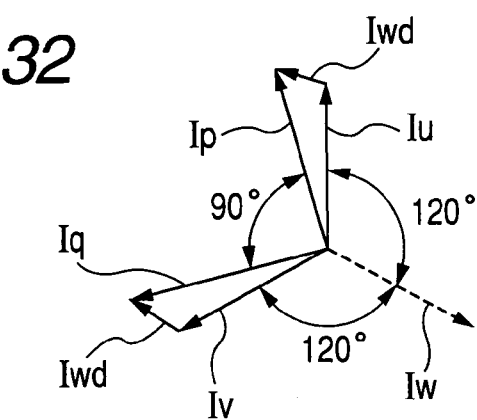
FIG. 32 is a vector diagram illustrating a method of apparently converting two-phase alternating currents into three-phase alternating currents by contriving the windings of a motor.

FIG. 32 is a vector diagram illustrating a method of apparently converting two-phase alternating currents into three-phase alternating currents by contriving the windings of a motor. Indicated by Iu, Iv, Iw are three-phase AC currents that pass through the respective three-phase windings, with the number of winding times in each of the phases being W3. A P-phase winding of the two-phase windings may be replaced by a U-phase winding in which the U-phase current Iu passes, and by a reverse W-phase winding whose number of winding times is 0.366×W3, in which the W-phase current Iw passes. A Q-phase winding may be replaced by a V-phase winding in which the V-phase current Iv passes, and by the reverse W-phase winding whose number of winding times is 0.366×W3, in which the W-phase current Iw passes. In this case, the phase difference between the composite P-phase current Ip and the Q-phase current Iq are 90 degrees.

Figure 33:
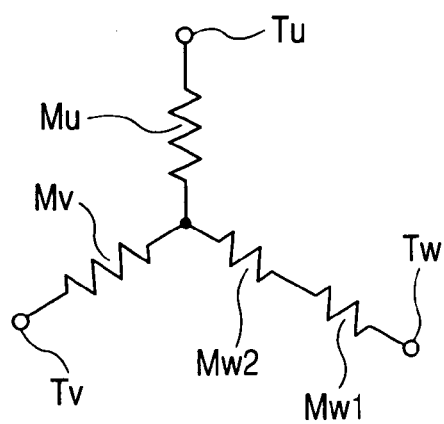
FIG. 33 is an electrically equivalent diagram illustrating specific windings for passing two-phase alternating currents in an apparent manner.

FIG. 33 is an electrically equivalent diagram illustrating specific windings for passing two-phase alternating currents in an apparent manner. The three-phase currents Iu, Iv, Iw pass through three-phase terminals Tu, Tv, Tw, respectively, of three-phase AC windings. Among these windings, a U-phase winding (Lu) and a reverse W-phase winding Mw1 (corresponding to a portion of a W-phase winding Lw) whose number of winding times is 0.366×W3, are used as a P-phase winding for a two-phase motor. Further, a V-phase winding (Lv) and a reverse W-phase winding Mw2 (corresponding to a portion of a W-phase winding Lw) whose number of winding times is 0.366×W3, are used as a Q-phase winding. By setting such a specification of windings, two-phase currents for a two-phase motor may be composed from the three-phase currents. It should be noted that any method of producing such three-phase AC windings may be used if it provides the same amplitudes and 90-degree phase difference as shown in FIG. 32. Thus, various modifications of the method may be provided.

The torque of a two-phase motor may be expressed by the formula (8) as provided above. That is, the torque generated in each phase may be expressed as a product of three values, i.e. the number of winding times W, the rotation angle changing rate E of flux linkage, and the current I. For example, if the number of winding times W is smaller than a predetermined one, the balance may be compensated by the current I or the rotation angle changing rate E of flux linkage to obtain the predetermined torque Ta. Thus, if the rotation angle changing rate E of flux linkage and the current I, which are to be determined by a design of the magnetic circuit and the number of winding times W, cause an error in respect of ideal values of the two-phase AC motor, the design may be ensured so as to compensate the error with other values.

(Eighth Modification)

A method of reducing torque ripples in an AC motor is described below. This method of reducing torque ripples includes, in case of reducing torque ripples of the RN1 (=m) order, grouping a plurality of Nx-phase poles of a stator into N1 (=n) groups, and shifting the positions of the stator poles in the rotating direction of each group, relatively to each other, by the integral multiple of an electrical angle of 360/(RN1×RN1) degrees. The positions of the stator poles of other phases are shifted in the direction of rotation in the same fashion as the Nx-phase stator poles.

Figure 34:
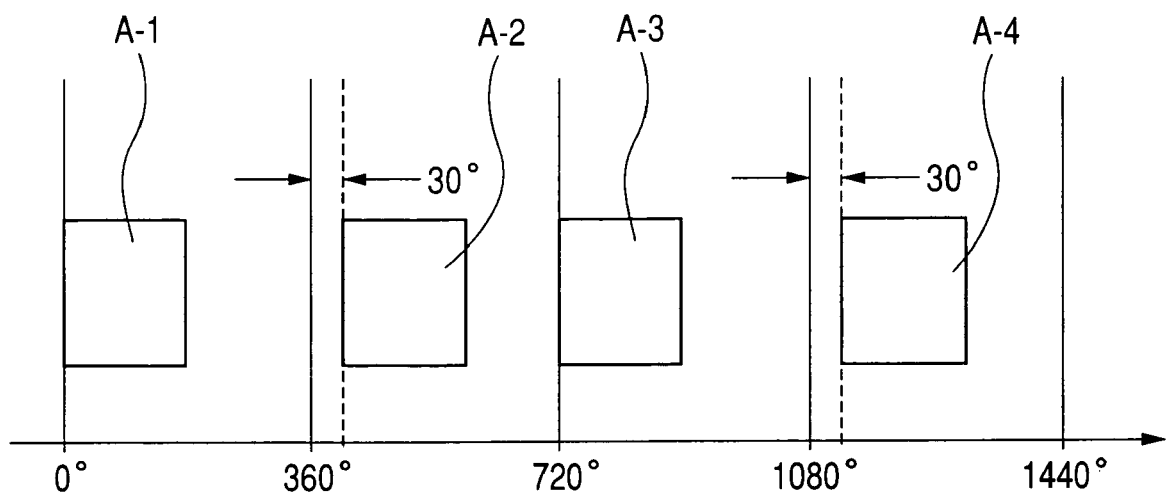
FIG. 34 shows a specific example of positional shifting of stator poles, which is carried out for decreasing torque ripples.

FIG. 34 shows a specific example of shifting the stator pole positions for reduction of torque ripples. In FIG. 34, a positional structure for reducing torque ripples is illustrated only with respect to the P-phase stator poles among those shown in FIG. 3. The Q-phase stator poles having the same positional structure are not shown to avoid complication. The numerals plotted along the horizontal axis in FIG. 34 indicate electrical angles of a stator in the circumferential direction.

By way of example, a stator configuration which enables removal of a sixth-order torque ripple component is described below. The four stator poles shown in FIG. 34 are grouped into two, i.e. a group of A1 and A3, and a group of A2 and A4. As an equation 360/(RN1×RN1)=360/(6×2)=30 degrees constitutes, the circumferential positions of the stator poles A2 and A4 may be shifted by an electrical angle of 30 degrees in the circumferential direction as shown in FIG. 34. As a result, sixth-order harmonic components among the torque components generated from the two groups of the stator poles are cancelled in terms of the whole AC motor because the phases are differentiated from each other by 180 degrees.

If the fifth-order harmonic component of the torque ripples is also desired to be removed from the state described above, the stator poles are grouped into two, i.e. a group of A1 and A2, and a group of A3 and A4, for example. As an equation 360/(RN1×RN1)=360/(5×2)=36 degrees constitutes, the circumferential positions of the stator poles A3 and A-4 may be further shifted by an electrical angle of 36 degrees in the circumferential direction from the positions shown in FIG. 34. The direction of shifting, in FIG. 34, may be either right or left. In this case, however, since some of the poles have already been shifted in the right, the second shifting may be advantageously be made in the left to minimize the reduction of torque. As a result, in FIG. 34, A1 remains at the original position, A2 is shifted in the right by 30 degrees from the original position, A3 is shifted in the left by 36 degrees from the original position, and A4 is shifted in the left by 6 degrees from the original position as resulting from an equation 30−36=−6. The fifth- and sixth-torque ripples components may be thus reduced.

When reducing the torque ripples using the method described above, a motor having a larger number of poles facilitates grouping. Further, when reducing a plurality of harmonic components of torque ripples, the excellence of the effects of reduction may differ depending on grouping. Therefore, more effective reduction may be attained if the effects of the plural times of shifting are prevented from interfering with each other. For example, if the stator poles are grouped into eight, i.e. groups G1 to G8 to reduce three kinds of harmonic components of torque ripples, G5 to G8 are firstly shifted by a predetermined angle for the RN1-th order to remove the harmonic component of the RN1-th order. In this case, G1 and G5 may be considered to cancel with each other for the harmonic component of the RN1-th order. Similarly, G2 and G6, G3 and G7, and G4 and G8 may be considered to cancel with each other for the harmonic component of the RN1-th order. Accordingly, if G3 and G7, and G4 and G8 are simultaneously shifted, in this state, by a predetermined angle that can cancel the harmonic component of an RN2-th order, the cancellation effects for the harmonic component of the RN1-th order may be considered not to be reduced. This means that, as a result, the harmonic components of the RN1-th and RN2-th orders in torque ripples have been reduced. Additionally, when removing the harmonic component of an RN3-th order, G2 and G6, and G4 and G8 may be shifted by a predetermined angle for the RN3-th order, in a similar fashion, in consideration of each other's interference. In this way, the three kinds of harmonic components can be effectively reduced through the three kinds of shifting of the poles with the grouping of the poles hardly interfering with each other.

The method of shifting the poles has been described in detail by way of example in which phase differences of 180-degree electrical angle have been provided for the harmonic components so as to be cancelled as a result of additions. Alternatively, the poles may be grouped into three by setting a relative phase difference at 120 degrees for the harmonic components, by which the harmonic components may be cancelled when the three groups are composed. Thus, this method can be applied to a plurality of groups.

(Ninth Modification)

Figure 35:
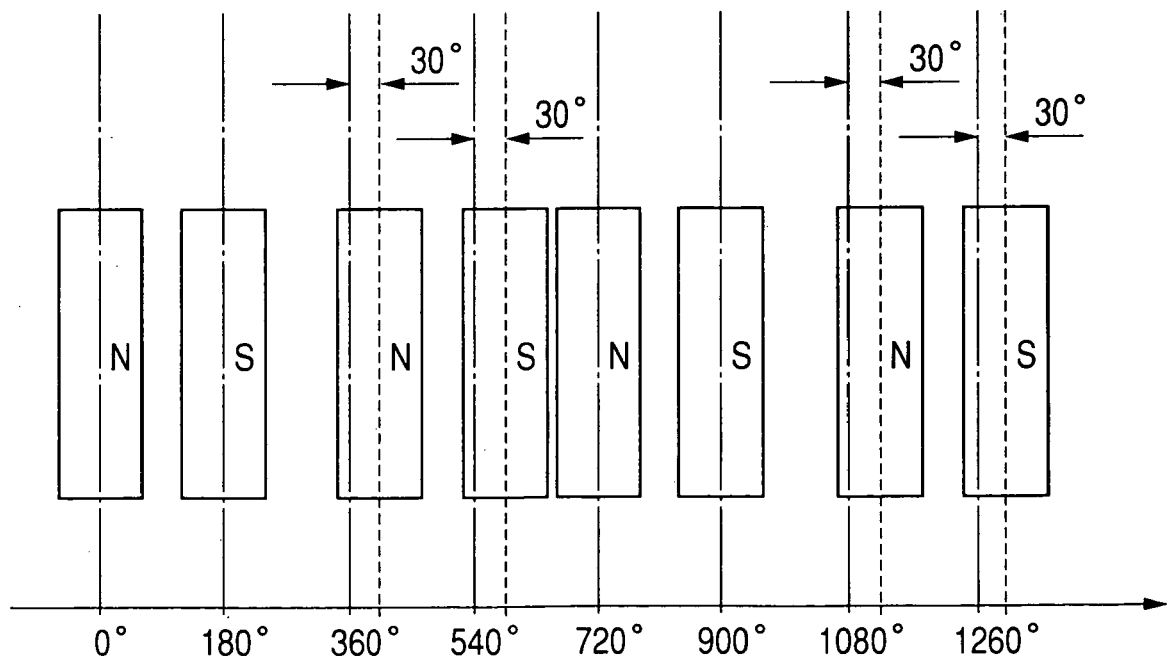
FIG. 35 shows a specific example of positional shifting of a permanent magnet, which is carried out for decreasing torque ripples.

Hereinafter, a method of reducing torque ripples of an AC motor by a rotor structure is described. Specifically, this method includes, in case of reducing torque ripples of the RN1 (=m) order, grouping a plurality of N poles and S poles of a permanent magnet of a rotor into N1 (=n) groups, and shifting in the circumferential direction the positions of the rotor poles in the rotating direction of each group, relatively to each other, by the integral multiple of an electrical angle of 360/(RN1×RN1) degrees. FIG. 35 shows a specific example of the shifting of a permanent magnet which is performed to reduce torque ripples.

In case of a rotor with magnets being attached on its surface as shown in FIG. 35, similar effects of reducing torque ripples may be obtained by attaching an annular magnet to the rotor, and polarizing the magnet such that desired polar positions on the attached magnet are polarized based on a polarization pattern. Further, more effective reduction of torque ripples, or further reduction of harmonic components, i.e. components of torque ripples, may be attained, by combining the method of reducing torque ripples by shifting the stator pole positions in the circumferential direction, with the method of reducing torque ripples by shifting the rotor pole positions in the circumferential direction.

(Tenth Modification)

A method of reducing magnetomotive force generated in the rotor shaft 11 is described below. As is apparent from the AC motor shown in FIG. 1, the currents passing the P-phase winding 23 and the Q-phase winding 24 constitute two-phase currents. The total of the magnetomotive forces resultant from these currents appears on the rotor shaft 11. For many applications, such magnetomotive forces that appear on the rotor 11 do not cause any problem. If, however, the magnetomotive forces are likely to cause problems, all or a portion of the rotor shaft 11 may be ensured be made of non-magnetic materials, such as stainless steel. Alternatively, a separate winding may be located in the vicinity of the rotor shaft 11 in order to offset the magnetomotive forces generated in the axial direction of the rotor shaft, which are equivalent to the total currents of the windings 23 and 24 wound about the stator 200.

Figure 36:
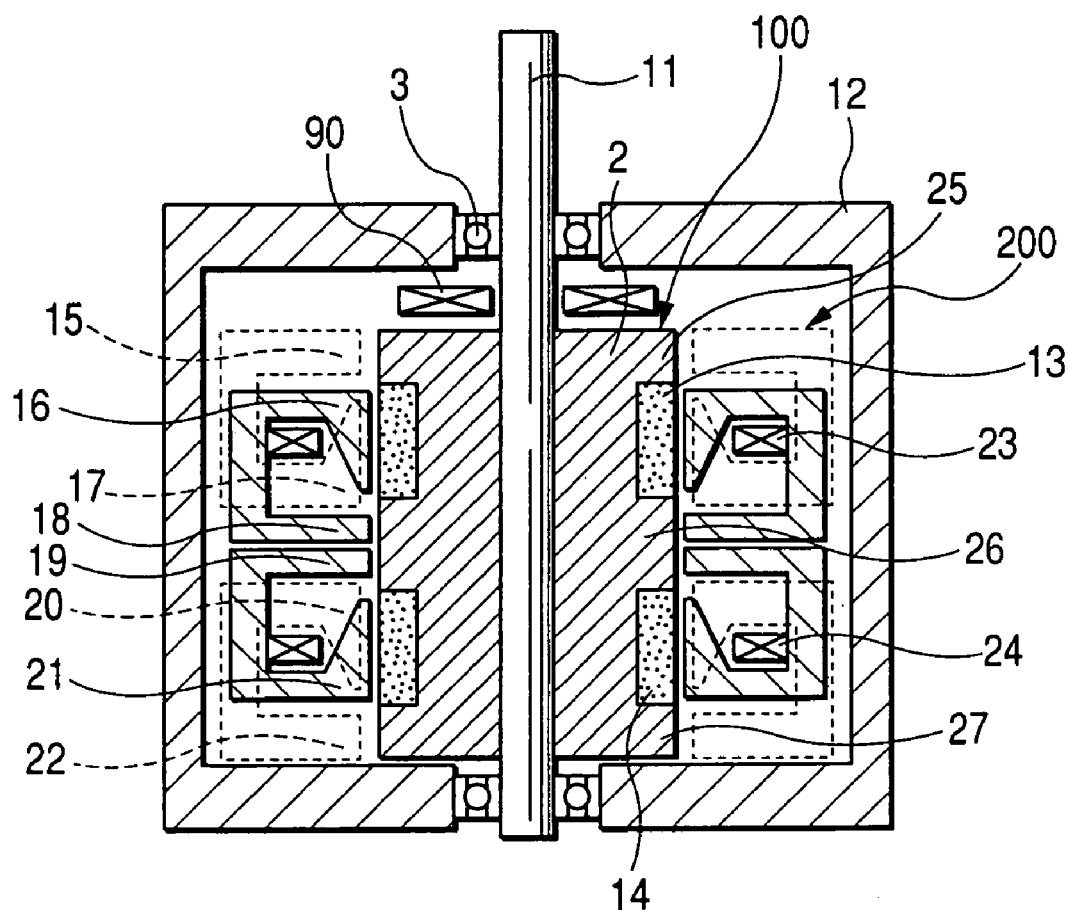
FIG. 36 is a vertical cross section of a modified AC motor to which a winding has been added for offsetting a magnetomotive force in an axial direction of a rotor.

FIG. 36 is a vertical cross section of a modification of an AC motor to which the separate winding has been added, for offsetting the magnetomotive forces in the axial direction of the rotor shaft 11. As shown in FIG. 36, a winding 90 is added, around which wires for passing the currents that flow through the P-phase winding 23 and the Q-phase winding 24 of the AC motor shown FIG. 1, are wound about in the opposite directions for the same number of times to cancel the magnetomotive forces in the axial direction of the rotor shaft 11. This eliminates magnetic damages, such as the attachment of iron powder induced by the magnetomotive forces produced in the axial direction of the rotor shaft 11. It is to be understood that the amount of the winding 90 is comparatively small because the diameter of the rotor shaft 11 is small.

(Eleventh Modification)

The control device of the AC motor of the present embodiment is described below. The output torque of the AC motor shown in FIG. 1 is expressed by the formula (8) as provided above. Thus, the control device of the AC motor of the present embodiment should just determine the currents of the windings 23 and 24 of the individual phases to satisfy the formula (8) for a desired torque command.

Figure 37:
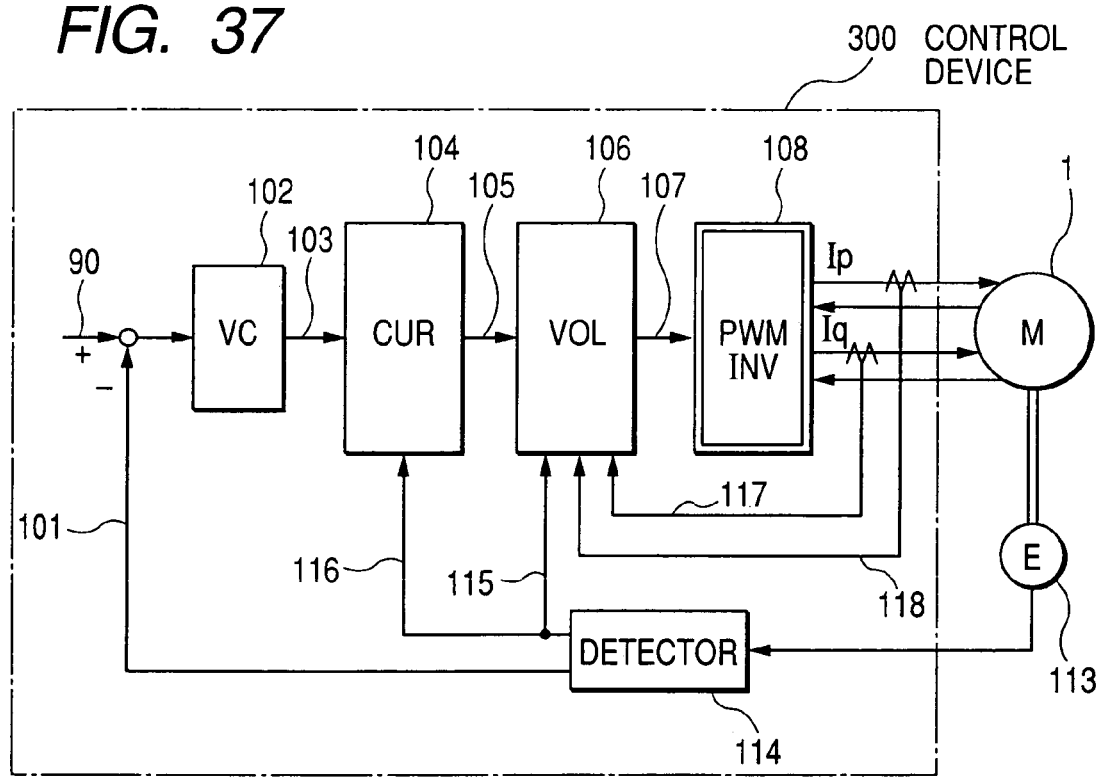
FIG. 37 shows a specific example of a control device for an AC motor.

FIG. 37 shows a specific example of the control device of the AC motor. As shown, a control device 300 comprises a speed control block (VC) 102, a current instructing block (CUR) 104, a voltage control block (VOL) 106, a power amplification block (PWM INV) 108, and a detector 114.

The detector 114 detects the number of revolutions of the AC motor 1 according to the present embodiment shown in FIG. 1 or the like, based on an output signal from an encoder (E) 113 which detects a rotational position of the AC motor 1, thereby outputting a speed detection signal 101. A speed deviation resulting from the subtraction of the speed detection signal 101 from a speed command 90 is inputted to the speed control block 102. The speed control block 102 then produces a torque command 103 by effecting proportional-plus-integral control, for example, based on the speed deviation. The current instructing block 104 produces current commands 105 for the windings 23, 24 of the individual phases, based on the torque command 103, various parameters of the AC motor 1, and a rotational position signal 116 of the AC motor 1 outputted from the detector 114. The voltage control block 106 calculates a current control error or the like based on the current command 105, current detection signals 117, 118 of the windings 23 and 24, and a rotational position signal 115 of the AC motor 1 outputted from the detector 114. The voltage control block 106 then effects commutation control with the rotational position signal 115, and produces voltage commands 107 for the windings 23, 24. The power amplification block 108 inputs the voltage commands 107 for the windings 23, 24 to carry out PWM (Pulse-Width Modulation) modulation, and allows an inverter, which employ a two-phase transistor bridge, for example, to output the voltages and the currents Ip, Iq of the windings 23, 24 to the AC motor 1.

A method of controlling the current instructing block 104 is now described hereunder according to the formula (8). The rotation angle changing rates of the flux φp, φq which are present at the P phase and the Q phase, respectively, of the stator 100 are indicated by Ep=dφp/dθ, Eq=dφq/dθ. Further, the numbers of winding times of the windings of the individual phases are indicated by Wp, Wq, and the currents of the windings of the individual phases are indicated by Ip, Iq. The current instructing block 104 effects control of the currents Ip, Iq of the individual phases in response to a torque command Ta, so that a formula Ta=Tp+Tq=Wp×Ep× Ip+Wq×Eq×Iq is satisfied.

Particularly, the AC motor shown in FIG. 1, whose rotational position is indicated by θm, is characterized as expressed by the formulae (1) to (8). The unit voltages Ep, Eq of the respective phases have characteristics of ideal two-phase AC motor, which are expressed by the formulae provided below. The coefficients of the individual phases are assumed to be the same value as E1 which is a coefficient of the rotation angle changing rate of the flux linkage of the individual phases.

$$Ep = E1 \times \sin(\theta m) \qquad (9)$$

$$Eq = E1 \times \sin(\theta m + 90°) \qquad (10)$$

The currents Ip, Iq of the respective phases are assumed to be expressed by the following formulae, with a current phase angle being indicated by θi, which is a phase difference between the polar direction of the rotor 100 and the current to be controlled.

$$Ip = Ia \times \sin(\theta m + \theta i) \qquad (11)$$

$$Iq = Ia \times \sin(\theta m1 + 90° + \theta i) \qquad (12)$$

From the formula (8), the torque Ta is as expressed by the following formula.

$$\begin{aligned}
Ta &= Tp + Tq \\
&= Wc \times (Ep \times Ip + Eq \times Iq) \\
&= Wc \times (E1 \times \cos(\theta m) \times Ia \times \cos(\theta m + \theta i) + \\
&\quad E1 \times \cos(\theta m + 120°) \times Ia \times \cos(\theta m + 120° + \theta i) + \\
&\quad E1 \times \cos(\theta m + 240°) \times Ia \times \cos(\theta m + 240° + \theta i)) \\
&= Wc \times Ia \times E1 \times \cos\theta i
\end{aligned} \qquad (13)$$

where Wc indicates the number of winding times of the individual phases. Since the winding times Wc and the coefficient E1 are the readily known values as the motor parameters, the current amplitude Ia is obtained from the following formula.

$$Ia = Ta/(Wc \times E1 \times \cos \theta i) \qquad (14)$$

When no particular field-weakening control is effected, a normal current phase angle is θi=0. Accordingly, in the case mentioned above, the function of the current instructing block 104 is obtained by simply making a calculation using the formula (13).

In such cases as where the number of winding times of the respective phases is different from each other for the convenience such as of design of the AC motor, and where the unit voltages Ep, Eq of the respective phases are not of balanced two phases, and thus the phases or the amplitudes are different from each other, the current amplitude Ia and the current phase θi can be determined by assigning each value to the formula (8). In a complicated case, such as the case where the unit voltages Ep, Eq, Ew of the respective phases are not of balanced two phases and have harmonics, briefly, in the case where torque ripple components are contained, the appropriate current amplitude Ia and the current phase θi can be again determined by using the formula (8) depending on the rotational position θm of the AC motor, provided that accurate characteristics of the unit voltages Ep, Eq are recognized. In this case, having made a determination of the current amplitude Ia and current phase θi so as to obtain the torque Ta, means that the control for reducing torque ripples has also been made.

As described above, if a form having ideal magnetic circuit structure and winding characteristics of in an AC motor is not realized due to the convenience of design or the like, drive/control of the AC motor may be realized with less torque ripples, by effecting current control of the individual windings according to the given formula determined by the parameters of the AC motor. In particular, when the AC motor 1 or the like is utilized as a stepping motor, detent torque in the stepping motor may be reduced.

It is to be understood that each of the blocks of the control device 300 may be altered. For example, the encoder 113 and the detector 114 may be replaced by a means for obtaining a position detection signal from the voltage and current of the AC motor by a position detection technique, which is so-called sensor-less position detection. As to the method of detecting the currents of the individual phases and as to the method such as of amplifying the voltage and current of the AC motor, they may be replaced by other methods than the ones shown in FIG. 37. When two-phase currents are produced in a pseudo manner from three-phase currents using the method as shown in FIG. 32, currents may be calculated with conversion and control may be effected by using a three-phase power amplifier. As to multi-phase AC motors of more than two phases, the same concept may be applied to effect appropriate motor control.

(Twelfth Modification)

A structure of an AC motor illustrated in FIG. 26 has been such that the stator-side neutral pole 72 was disposed approximately at the central portion of the rotor shaft 11. A modification of the AC motor described below is the one in which the position of a stator-side neutral pole is changed.

Figure 38:
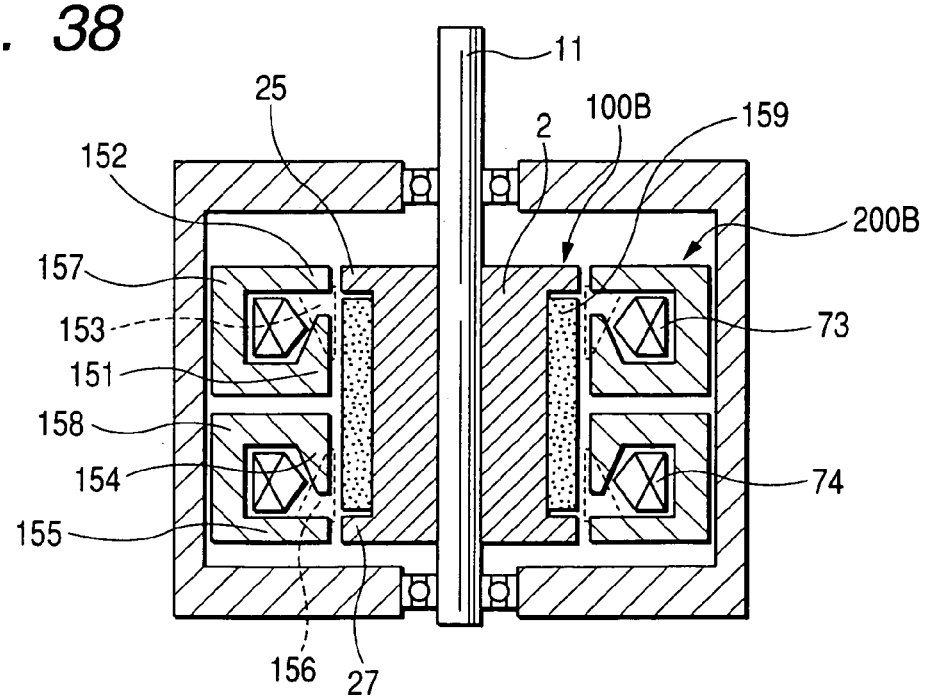
FIG. 38 is a vertical cross section of a modified AC motor in which the positions of neutral poles of a stator have been changed.

FIG. 38 is a vertical cross section of a modified AC motor with the position of a stator-side neutral pole being changed. In the AC motor shown in FIG. 38, stator-side neutral poles 152, 155 are disposed at the opposite ends of the stator with respect to the axial direction of the motor shaft 11. A permanent magnet 159 is utilized in driving both the P phase and the Q phase. The flux of the permanent magnet 159 is directed to other portion passing through the back yoke 2 of a rotor 100B. Neutral poles 25, 27 of the rotor 100B are disposed, respectively, to be opposed to the stator-side neutral pole 152 of the P phase and the stator-side neutral pole 155 of the Q phase. Flux is formed between the rotor-side neutral pole 25 and the neutral stator pole 152, and likewise between the rotor-side neutral pole 27 and the neutral stator pole 155.

Figure 39:
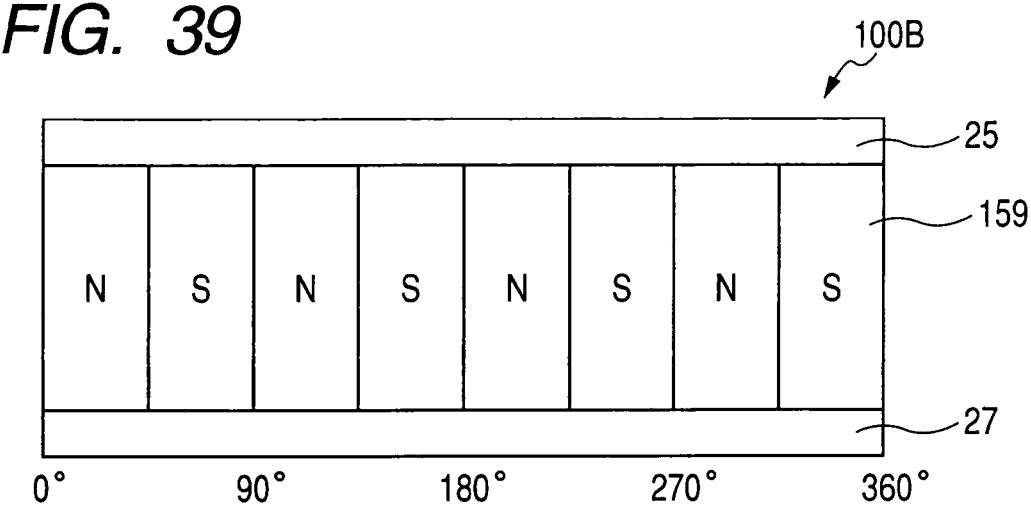
FIG. 39 is a linear expansion plan of a surface profile of a rotor in the AC motor shown in FIG. 38 shows.

FIG. 39 is a linear expansion plan, along the direction of rotation, of the surface profile of the rotor of the AC motor shown in FIG. 38. The numerals plotted along the horizontal axis indicate rotational angles in terms of mechanical angles, in which 360 degrees mean one rotation. As shown in FIG. 39, the rotor 100B has an eight-pole structure, on the surface of which the N poles and the S poles of the permanent magnet 159 are alternately provided. As shown, the neutral poles 25, 27 of the rotor 100B are disposed at the opposite ends of the rotor 100B with respect to the axial direction.

Figure 40:
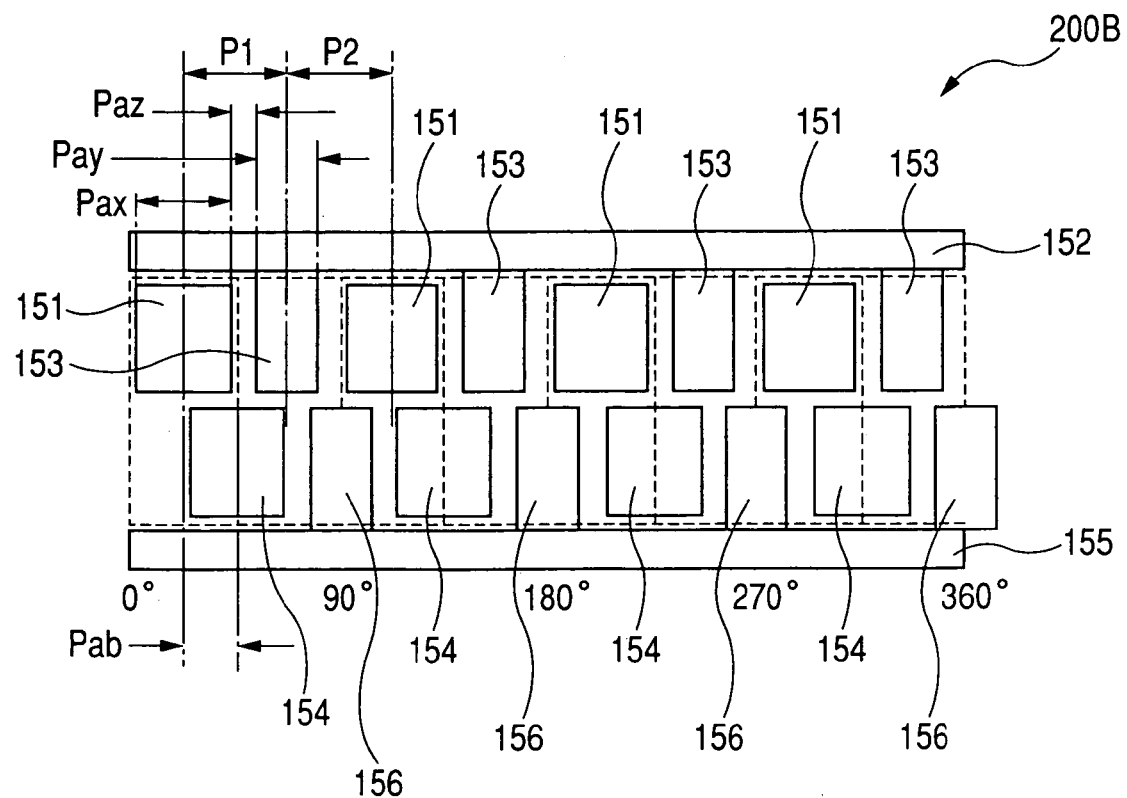
FIG. 40 is a linear expansion plan, along the direction of rotation, of an inner peripheral surface of the stator shown in FIG. 38.

FIG. 40 is a linear expansion plan of the inner peripheral surface of a stator 200B along the direction of rotation. The numerals plotted along the horizontal axis indicate rotational angles in terms of mechanical angles, in which 360 degrees mean one rotation. A phase difference Pab of a Q-phase stator pole 154 relative to a P-phase stator pole 151 is 22.5 degrees in mechanical angle which is 90 degrees in electrical angle. The phase difference between stator poles in the same phase is the sum of P1 and P2, which is 90 degrees in mechanical angle, i.e. 360 degrees in electrical angle.

In FIG. 38, reverse stator poles 153, 156 shown by broken lines are for absorbing reverse flux of the P-phase and Q-phase stator poles 151, 154, and are each magnetically connected to the stator-side neutral poles 152, 155. The AC motor functions if these reverse stator poles, 153 156 are omitted. Thus, the stator structure may be simplified by the omission of the reverse stator poles 153, 156, which may in turn increase the amount of coil of the P-phase winding 73 and the Q-phase winding 74, and simplify the structure.

Contrarily, unnecessary flux components on the surface of the rotor, which do not pass the stator poles 151, 154, may be absorbed by adding the stator poles 153, 156, thereby increasing generation of torque of the AC motor, although this may depend on the rotor structure and magnetic characteristics of the rotor.

The P-phase stator pole 151 and the Q-phase stator pole 154 are needed to be disposed being magnetically isolated from each other, because the smaller the magnetic interference is, the easier the generation of torque becomes as a simple theory. More preferably, the motor case 12 may be made of a non-magnetic material, so that the leakage flux from between both of the stator cores may be reduced. Alternatively, the case may be formed of thin plates, or something of large magnetic resistance may be disposed between the stator 200B and the motor case 12. The AC motor illustrated in FIG. 38 is disadvantageous in comparison with the AC motor illustrated in FIG. 26 in that magnetic isolation between the P-phase stator and the P-phase stator may not be readily carried out.

(Thirteenth Modification)

Figure 41:
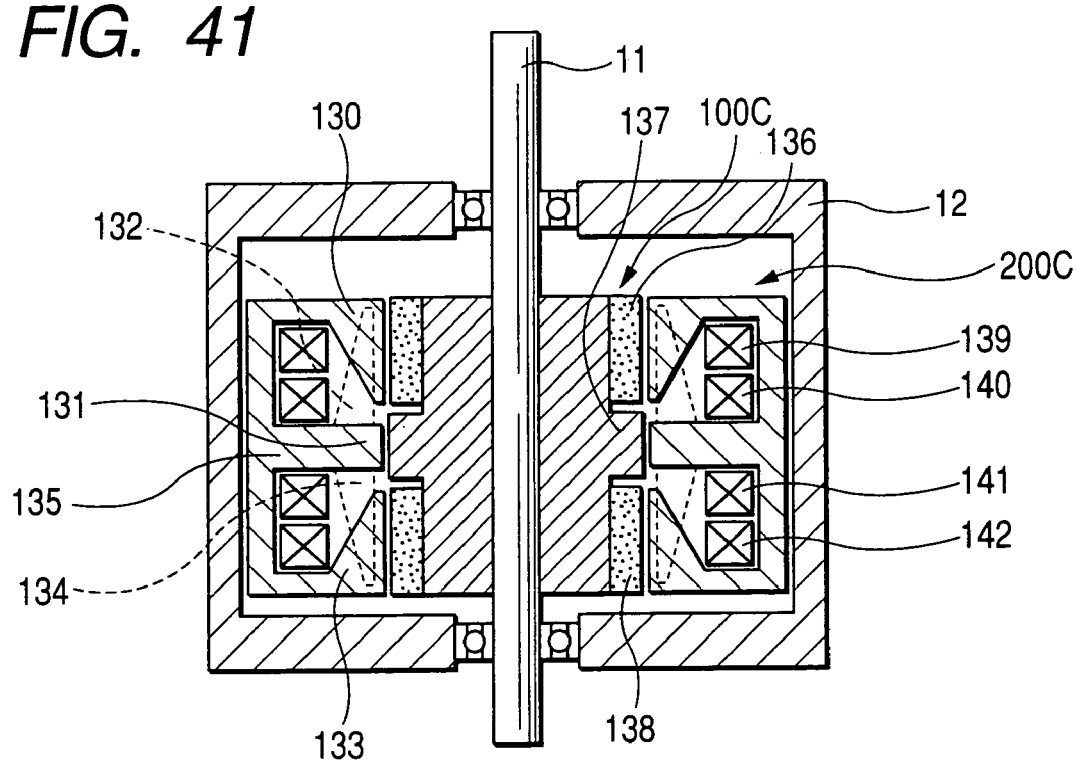
FIG. 41 shows a three-phase AC motor consisting of a U phase, V phase and a W phase, which is a modification of the two-phase AC motor consisting of the P phase and the Q phase shown in FIG. 26.

FIG. 41 illustrates a three-phase AC motor consisting of a U phase, V phase and W phase, which has been modified from the two-phase AC motor consisting of the P phase and the Q phase as illustrated in FIG. 26. A rotor 100C has permanent magnets 136, 138, and a rotor-side neutral pole 137. The surface profile of the rotor, being linearly expanded in the direction of rotation is similar to the one shown in FIG. 2 except that the rotor-side neutral poles 25, 27 have been removed.

A stator 200C comprises forward U-phase stator poles 130, W-phase stator poles 133, a stator-side neutral pole 131, commutating poles 132, 134, and windings 139, 140, 141, 142. There is no V-phase stator pole based on the concept of the three-phase AC theory from which an equation V=−U−W may be derived. Specifically, this concept is to substitute the U-phase stator poles 130 and the W-phase stator poles 133 for the effects of the V-phase stator poles based on the three-phase AC theory. The stator-side neutral pole 131 directs the flux at a back yoke 135 of the stator 200C to a back yoke of the rotor 100C. The commutating poles 132, on one hand, are disposed at the positions reverse to the U-phase stator poles 130 to direct the flux to the stator-side neutral pole 131. The commutating poles 134, on the other hand, are disposed at the positions reverse to the W-phase stator poles 133 to direct the flux to the stator-side neutral poles 131.

Figure 42:
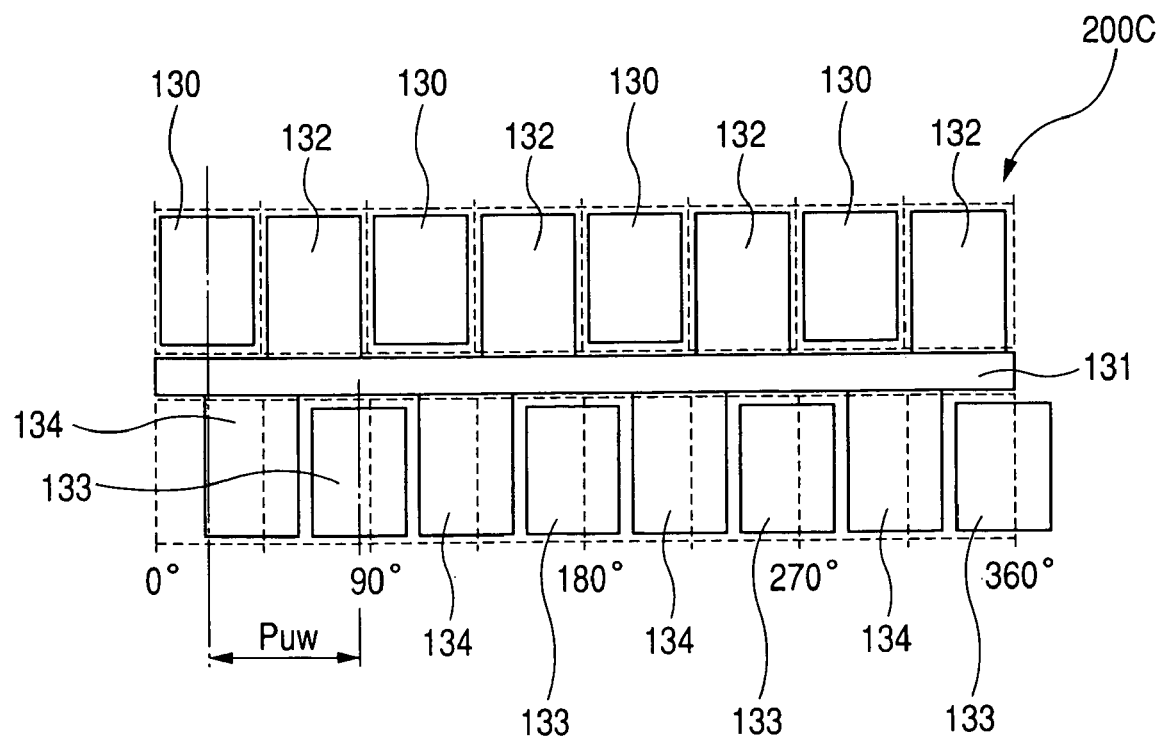
FIG. 42 is a linear expansion plan, along the direction of rotation, of an inner peripheral surface of the stator shown in FIG. 41.

FIG. 42 is a linear expansion plan, along the direction of rotation, of the inner peripheral surface of the stator 200C illustrated in FIG. 41. The numerals plotted on the horizontal axis indicate rotational angles in terms of mechanical angles, in which 360 degrees mean one rotation. A phase difference Puw of the W-phase stator poles 133 relative to the U-phase stator poles 130 is 30 degrees in mechanical angle, which is 120 degrees in electrical angle.

Figure 43:
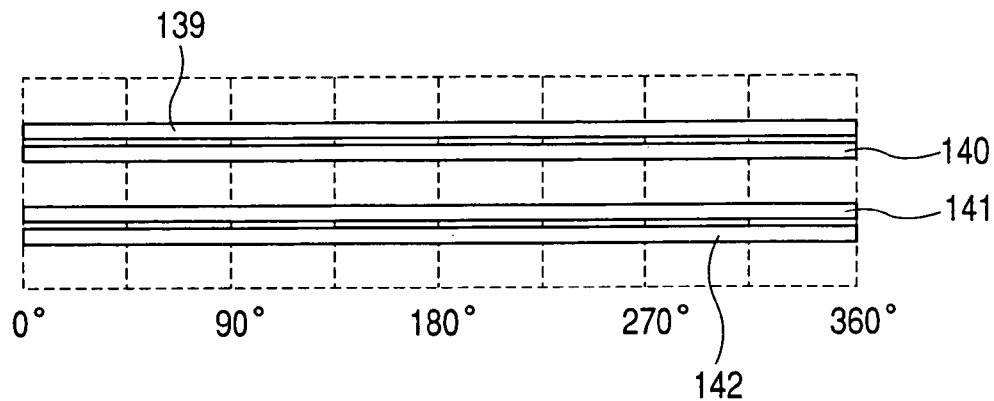
FIG. 43 is a linear expansion plan, along the direction of rotation, of a winding of the rotor shown in FIG. 41.

FIG. 43 is a linear expansion plan, along the direction of rotation, of the windings 139 to 142 of the rotor 100C shown in FIG. 41. Each of the windings 139 to 142 included in the rotor 100C has substantially a looped shape. The windings 139, 140 correspond to the U phase in which the winding 139 is wound so that a reverse-phase current passes therethrough. Also, the windings 141, 142 correspond to the W phase in which the winding 141 is wound so that a reverse-phase current passes therethrough.

Figure 44:
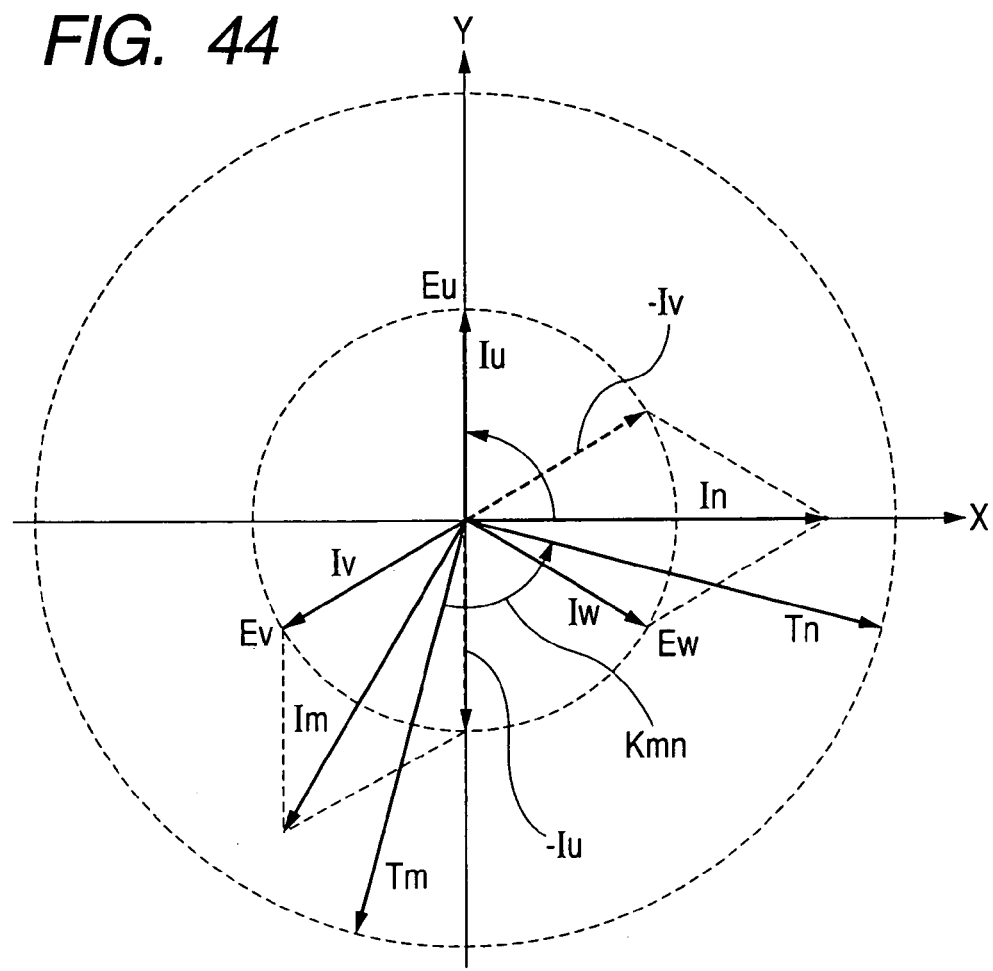
FIG. 44 is a vector diagram indicating the performance of the AC motor shown in FIG. 41.
Figure 45:
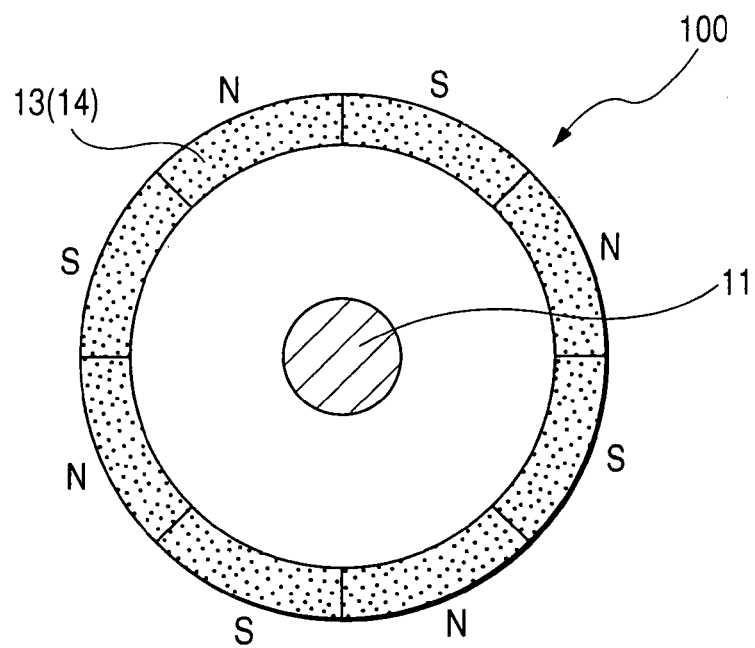
FIG. 45 is a transverse cross section of a basic rotor.

FIG. 44 is a vector diagram indicating an operation of the AC motor illustrated in FIG. 41. In FIG. 44, indicated by Iu is a U-phase current, by Iv is a V-phase current and by Iw is a W-phase current. FIG. 44 illustrates an example in which the phases of unit voltages Eu, Ev, Ew are identical with the phases of the currents Iu, Iv, Iw for the respective phases. In short, in FIG. 44, the vectors for Eu, Ev, Ew are also the vectors for Iu, Iv, Iw. It is to be understood that Eu, Ev, Ew are referred to as unit voltages, and thus, similar to the relation expressed by the formulae (1) and (2) as an example of two phases, the rotation angle changing rates of the flux linkages φu, φv, φw of the respective phases are expressed by dφu/dθ, dφv/dθ, dφw/dθ. Similarly, by converting the formulae (1) to (9) involved in the two-phase example into three-phase versions, voltage, current, torque and power for three phases may be obtained. Induced voltages Vu, Vv, Vw of the respective phases are expressed as follows, provided that rotation is made at a constant rotation expressed by dθ/dt=S1, that the numbers of winding times of the U-phase, V-phase and W-phase windings are Wu, Wv, Ww, respectively, and that the flux are of forward direction, which interlink the respective looped windings upwardly as viewed from the drawing sheet.

$$Vu = Wu \times (d(-\phi u)/dt)$$
$$= -Wu \times d\phi u/d\theta \times d\theta/dt$$
$$= -Wu \times Eu \times S1$$

As negative signs are affixed to the above formula for Vu, by passing a negative current as Iu or by giving reverse winding to the U-phase winding, the following formula is obtained.

$$Vu = Wu \times Eu \times S1 \quad (15)$$

The U-phase winding 140 and the W-phase winding 141 correspond to the V-phase winding. The U-phase winding 140 is wound in forward direction, and the W-phase winding 141 is wound in reverse direction. These two windings 140, 141 are to be connected in series. The voltage induced in the U-phase winding 140 is at the same level as the voltage of the U-phase winding 139, and similarly the voltage induced in the W-phase winding 141 is at the same level as the voltage of the W-phase winding 142. However, because of the reverse winding, the V-phase voltage Vv is finally expressed by the following formula.

$$Vv = -Vu - Vw \quad (16)$$

The flux interlinking the V-phase winding is specifically the flux that flows from the back yoke 135 to the rotor 100C via the neutral pole 131. Although the V-phase flux φv and the V-phase current Iv do not directly provide electromagnetic effects, such effects are to be attained by the U-phase flux and the W-phase flux. This, however, is based on the assumption that the magnetic resistance between the stator-side neutral pole 131 and the rotor-side neutral pole 137 is sufficiently smaller than the entire magnetic resistance of the AC motor to an extent not to inhibit the functions. The formula (16) is provided in a manner satisfying a relation Vu+Vv+Vw=0 from a viewpoint of the generalized three-phase AC theory.

The voltage Vw of the W-phase winding is expressed as follows.

$$Vw = Ww \times Ew \times S1 \quad (17)$$

Powers Pu, Pv, Pw of the respective phases and an output power Pa of the AC motor are expressed by the following formulae.

$$Pu = Vu \times Iu = Wu \times Eu \times S1 \times Iu \quad (18)$$

$$Pv = Vv \times Iv = Wv \times Ev \times S1 \times Iv \quad (19)$$

$$Pw = Vw \times Iw = Ww \times Ew \times S1 \times Iw \quad (20)$$

$$Pa = Pu + Pv + Pw = Vu \times Iu + Vv \times Iv + Vw \times Iw \quad (21)$$

Torques Tu, Tv, Tw of the respective phases and an output torque Ta of the AC motor are expressed by the following formulae.

$$Tu = Pu/S1 = Wu \times Eu \times Iu \quad (22)$$

$$Tv = Pv/S1 = Wv \times Ev \times Iv \quad (23)$$

$$Tw = Pw/S1 = Ww \times Ew \times Iw \quad (24)$$

$$Ta = Tu + Tv + Tw \quad (25)$$
$$= Wu \times Eu \times Iu + Wv \times Ev \times Iv + Ww \times Ew \times Iw$$

The same phenomenon may be expressed from a different viewpoint. That is, because the currents passing through the windings 139, 140 are the currents passing through electromagnetically and substantially the same space, and because the currents are equivalent to the sum of −Iu and Iv, the sum is regarded as indicated by Im in FIG. 44. As this current Im effects as a voltage −Eu, its torque is Tm. Likewise, the currents of the windings 141, 142 are the sum of −Iv and Iw, which can be regarded as a current In. As this current In effects as a voltage −Ew, its torque is Tn. In this regard, an angle Kmn made between Tm and Tn is 90 degrees in electrical angle. Thus, it may be understood that the torque Ta of the entire AC motor may be expressed as a sum of torques Tm and Tn having the same amplitudes which are orthogonal to each other, and that a constant torque output may be possible regardless of the rotational position. Consequently, although the AC motor illustrated in FIG. 41 is a motor that operates with three-phase alternating currents, it can be regarded as a motor having characteristics resembling in its operation to a two-phase motor. It is to be understood, further, that the vector diagram shown in FIG. 44 is a simplified one disregarding such voltage factors as ascribed to the voltage reduction due to the resistance of windings, or ascribed to the leakage of inductance.

The current Im shown in FIG. 44 can be regarded as the currents passed through the windings 139 and 140. Therefore, if these two windings 139, 140 are aggregated into one winding so that the current Im can be passed therethrough, completely the same level of operation can be attained. Similarly, the windings 141, 142 may be aggregated into one winding to pass the current In therethrough. It is not only that the windings are simplified but also that copper loss may be theoretically reduced by 25%, thereby improving the output. Because the torque is expressed by the formula (25), by selecting the flux, current magnitude and phase which are different from the ones described above for modification of the configuration described above, attain the similar effects may be attained.

The above description has been made with respect to the rotor poles and stator poles having a rectangular shape for an explanation of the principle, however, various modifications may be made. For example, the shape may be modified such as into a skew form and an ellipse to reduce torque ripples.

(Fourteenth Modification)

In each of the AC motors described above, a surface-magnet type rotor has been used, however, various types of rotors may be used. FIGS. 45 to 50 are transverse cross sections of various rotors. A rotor 100 shown in FIG. 45 has a structure corresponding to the basic configuration form shown in FIG. 1. The rotor 100 has eight permanent magnets 13 (or permanent magnets 14 or the like) on its surface along the circumferential direction, which are disposed so that an N pole and an S pole alternately appear.

Figure 46:
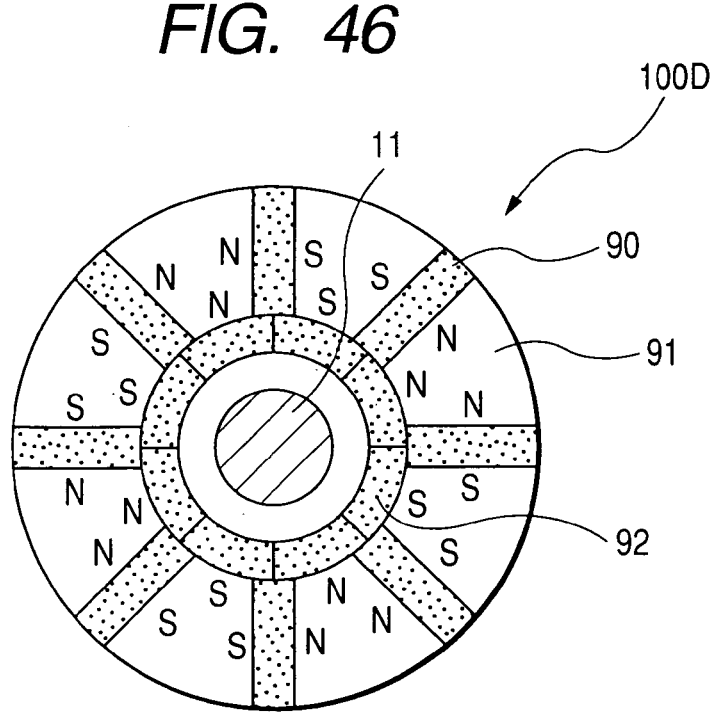
FIG. 46 is a transverse cross section of a modified rotor.

A rotor 100D shown in FIG. 46 has a structure wherein polarized permanent magnets 90 are radially disposed (i.e. disposed in the direction of the diameter) along the circumferential direction with each of ferromagnetic pole pieces 91 being interposed between the adjacent permanent magnets 90. The pole pieces 91 have an effect of collecting the flux of the permanent magnets 90, by which the flux density on the surface of the rotor 100D may be increased. The flux may also readily transit toward the rotor shaft 11 within each of the pole pieces 91. For this reason, the flux may be efficiently directed from the rotor 100D to the stator poles even if the surface profiles of the stator poles facing the gap are uneven, thereby obtaining an effect of increasing motor torque. By making pole pieces 92 and the rotor shaft 11 with non-magnetic materials, the inner structure of the rotor 100D can supply the flux generated by the permanent magnets 90 to the stator. Also, by allowing the pole pieces 92 to alternately serve in the circumferential direction as the permanent magnets which are directed as shown in the figure, leakage flux toward adjacent rotor poles may be reduced. In addition, by allowing the eight pole pieces 92 to serve as permanent magnets in the circumferential direction, being polarized as shown in the figure, larger flux density may be obtained on the rotor surface.

Figure 47:
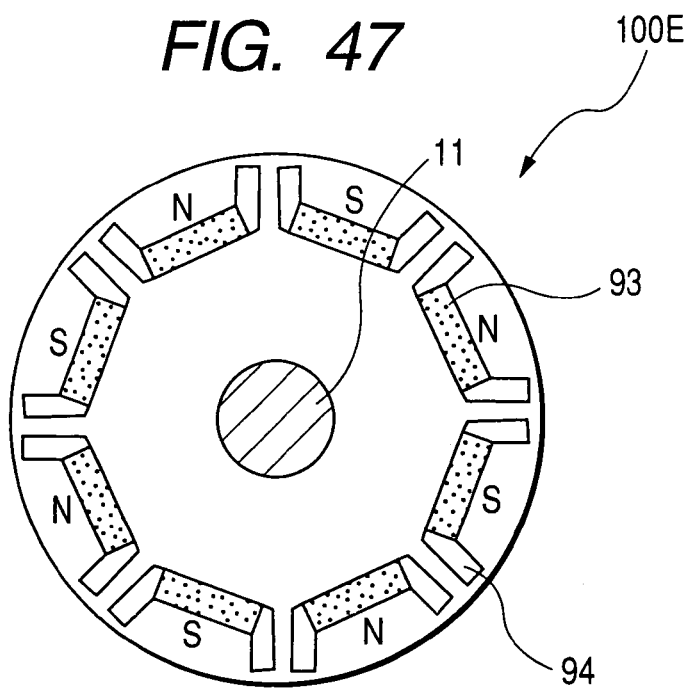
FIG. 47 is a transverse cross section of a modified rotor.

A rotor 100E shown in FIG. 47 has a so-called IPMSM (Interior Permanent Magnet Synchronous Motor) structure in which permanent magnets 93 are disposed in an internal manner. Spaces 94 are formed in the circumferential direction at opposite ends of each of the permanent magnets 93 so as to go along the outer periphery. Alternatively, non-magnetic materials may be filled in these spaces. The rotor 100E is characterized in that both the torque produced by the permanent magnets 93 and the reluctance torque produced by a ferromagnetic material at portions other than the permanent magnets, are obtained. At the same time, the magnitude of the field flux can be controlled by controlling the rotational position of the rotor and the current phase of the stator. Thus, a so-called field-weakening control can be performed to control a current phase in such a way that the magnitude of the field magnet is made smaller at a high-speed rotation, thereby obtaining constant power characteristics. In addition, larger torque may be obtained by filling permanent magnet into the spaces 94, and thus by making the flux density of the rotor surface the larger.

Figure 48:
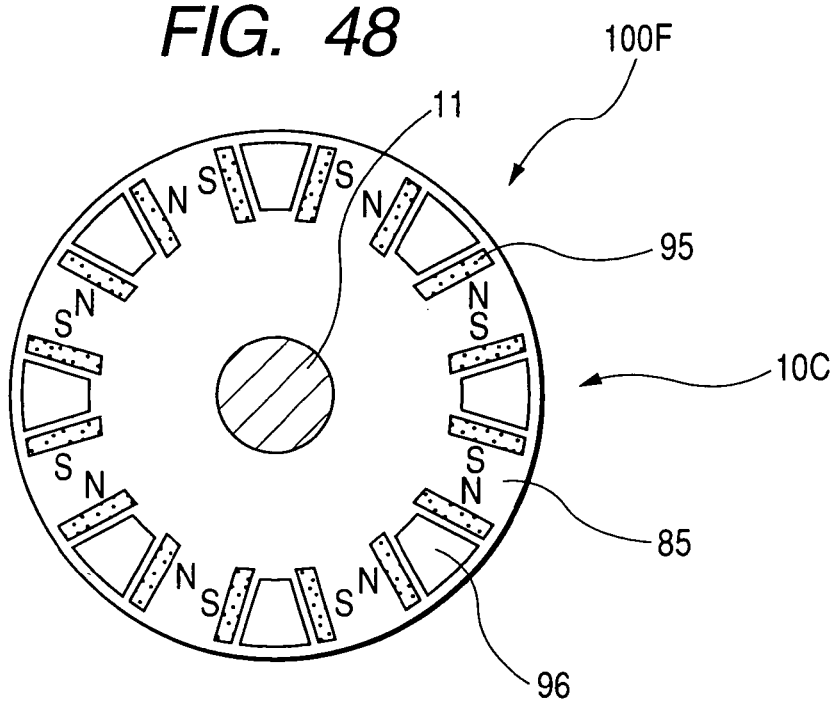
FIG. 48 is a transverse cross section of a modified rotor.

A rotor 100F shown in FIG. 48 has a structure wherein permanent magnets 95 are disposed in the rotor in an internal manner. Paired two permanent magnets 95 which are polarized in the same circumferential direction are disposed, respectively, at opposite ends of each of rotor poles 85. Eight pairs (sixteen in all) of such permanent magnets 95 are located along the circumferential direction with an even interval therebetween. The adjacent pairs of the permanent magnets 95 are reversely polarized from each other. In the rotor poles 85, field flux is excited by being magnetized by the current of the stator, so that torque may be generated in the context of the relationship with the magnetomotive force of the stator. As to the generation of torque, it may be described variously, but the torque may be considered to be generated such that the field flux is generated at the rotor poles 85 by a d-axis current component, and that torque is generated by a q-axis current component. In this case, the permanent magnets 95 is considered to operate to prevent the field flux at the rotor poles 85 generated by the d-axis current from being directed to the direction of the q-axis. As a result, the field flux which are present at the rotor poles 85 come to receive less impact of the q-axis current. Consequently, the d-axis current enhances the performance of controlling rotor flux magnitude. Owing to this, and in particular owing to the reduction of the voltage induced in a winding by reducing the field magnet at a high-speed rotation, a so-called constant power control may be effectively realized.

Figure 49:
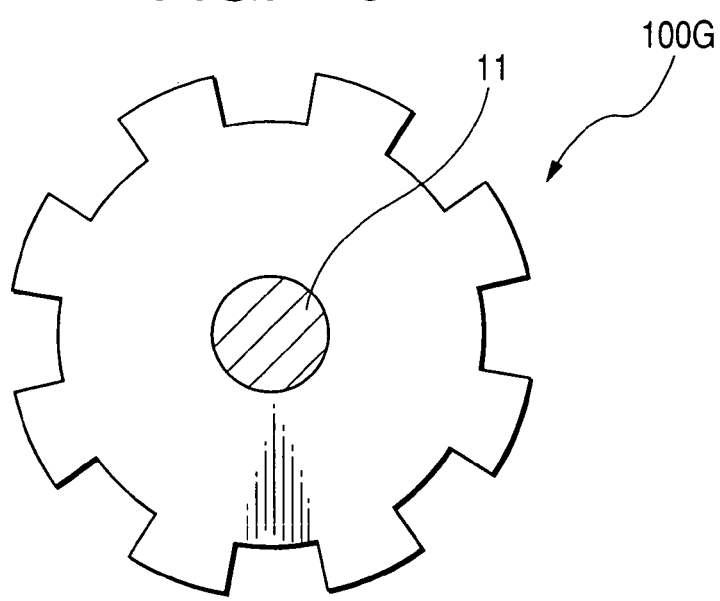
FIG. 49 is a transverse cross section of a modified rotor.

A rotor 100G shown in FIG. 49 has a salient pole structure and can be operated as a reluctance motor. In a conventional switched reluctance motor structure, a suction force in a radial direction has been unevenly present in the circumferential direction and varied significantly. In many cases, this caused a deformation of the stator in the radial direction, resulting in vibration or noises. However, in case of an AC motor using the rotor 100G shown in FIG. 49, suction force is produced in the radial direction with good balance throughout approximately the entire periphery. Further, an annular shape of the stator allows exhibition of high rigidity for uniform loading from the entire periphery. As a result, the rotor 100G may cause small vibration and noises. In addition, the rotor 100G can be obtained by only forming a magnetic material into a predetermined shape, and thus has quite a firm and simple structure, so that it may endure a centrifugal force under high-speed rotation. Moreover, by devising the shapes of the rotor poles and the stator poles, torque ripples may be reduced. Thus, the rotor 100G, in principle, has no cogging torque. Further, the rotor 100G uses no permanent magnet which is expensive and requires manufacturing costs such as in assembling, it can be produced at low costs.

Figure 50:
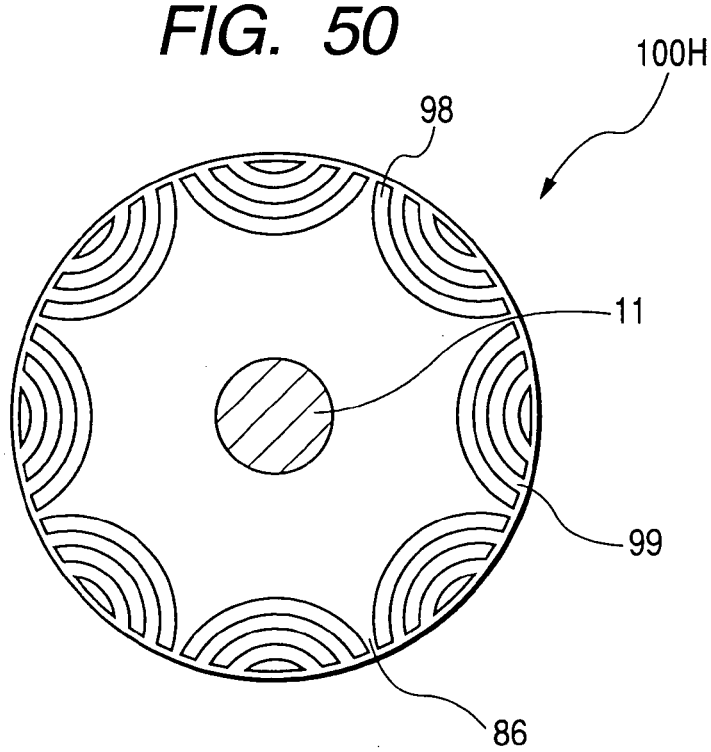
FIG. 50 is a transverse cross section of a modified rotor.

A rotor 100H shown in FIG. 50 has a so-called flux barrier structure, and can be operated as a reluctance motor. The rotor 100H comprises flux barriers 98 which are formed of spaces or non-magnetic materials. These flux barriers 98 are disposed between rotor poles 86 adjacent in the circumferential direction, being substantially coaxially arranged from the surface of the rotor 100H. Magnetic paths 99 are formed in narrow regions between the adjacent flux barriers 98. The rotor 100H has excellent characteristics which are similar to those of the rotor 100G.

Various modifications in the form of a rotor pole may be possible, such as an arc form so that the profile of the rotor poles has a diameter smaller than that of the outer periphery of the rotor, or a form which provides recesses at the boundaries between the rotor poles. The purposes and the effects of the inventive AC motor, are the same as those of the ordinary AC motors, i.e. reduction of torque ripples, reduction of vibration and noises, and conversion of voltage waveforms into sine waves.

Many examples have been described in which permanent magnets are used, however, a similar AC motor may be realized by using a rotor having electromagnets, or a rotor having a so-called claw-pole structure in which field windings or permanent magnets are axially disposed on the stator side.

It should be appreciated that the present invention is not limited to the embodiments described above, and various changes may be made within the spirit and the scope of the present invention. For example, although the stator has been disposed at the outer diameter side, and the rotor has been disposed at the inner diameter side in the embodiment described above, a so-called outer rotor motor structure may be configured by reversing the inner and outer diameters. Further, two motors may be disposed at both of the inner and outer diameter sides. In this case, there is provided an advantage that a portion of motor members, e.g. magnetic paths, permanent magnets, structural members for retaining strength, or a cover, may be integrated. Alternatively, the AC motor of the embodiment described above may be modified to provide a configuration in which a plurality of stators and rotors are disposed in the axial direction of the rotor. Alternatively, the profiles of the stator and the rotor may be such that the air gap made therebetween may have a conical shape, or a multi-stage cylindrical shape, or combination thereof. In addition, the current of a motor has been described herein as being of sine wave, however, the current may be of rectangular wave, or may be intermittently controlled. Further, variable current may be sequentially passed through the respective windings to provide an operation as a so-called stepping motor.

In the embodiment described above, description has been given as to the case of a motor having eight poles. The number of poles, however, is a matter of design, and thus the number can be freely selected. As to the number of phases, two-phase and three-phase have been discussed herein, however, the number of phases may be more than three to provide a multi-stage configuration.

What is claimed is:

1. An AC (alternating current) motor comprising:
   a rotor comprising
      a rotation shaft rotatable around a longitudinal central axis in an axial direction of the rotation shaft,
      N (north) magnetic poles and S (south) magnetic poles fixedly disposed by turns around the rotation shaft in a circumferential direction of the rotation shaft, and
      rotor-side neutral poles disposed fixedly and juxtaposedly to the N magnetic poles and the S magnetic poles, respectively, along the axial direction,
      a back yoke magnetically linked with the N magnetic poles and the S magnetic poles so as to serve as a back yoke member together with the N magnetic poles and the S magnetic poles; and
   a stator comprising a plurality of modules disposed in the axial direction to be opposed to the rotor, each module comprising:
      a winding wound along the direction of the rotation shaft in a loop shape,
      stator-side neutral poles disposed to be opposed to the rotor-side neutral poles;
      stator poles disposed to be opposed to either of the N magnetic poles and the S magnetic poles; and
      back yokes magnetically linking the stator-side neutral poles and the stator poles to each other.

2. The AC motor according to claim 1, wherein the back yokes in each of the modules is formed to have a magnetic circuit that allows each of a flux F1 generated from each N magnetic pole and a flux F2 generated from each S magnetic pole to interlink the winding via both of each rotor-side neutral pole and each stator-side neutral pole in the same direction.

3. The AC motor according to claim 2, wherein, when the plurality of modules are n (positive integer more than two), the stator poles included in each module are disposed along the same circumference whose center is the rotation shaft, at pitches of substantially 180 degrees in electrical angle, the disposed locations of the stator poles being shifted "360/n" degrees in electrical angle module by module.

4. The AC motor according to claim 2, wherein the plurality of stator poles disposed in each module is grouped into n-groups and the stator poles belonging to each group are relatively shifted along the circumference by an amount of integral multiple of 360/(m×n) degrees in electrical angle, where n is an positive integer and m is an order of torque ripples to be decreased.

5. The AC motor according to claim 2, wherein the N magnetic poles and the S magnetic poles disposed in the rotor are grouped into n-groups, every magnetic pole, and the N magnetic poles belonging to each group and the S magnetic poles belonging to each group are relatively shifted along the circumference by an amount of integral multiple of 360/(m×n) degrees in electrical angle, where n is an positive integer and m is an order of torque ripples to be decreased.

6. The AC motor according to claim 3, wherein, in each module, in place of the stator poles to be disposed along the same circumference around the rotation shaft at pitches of substantially 360 degrees in electrical angle, the stator-side neutral poles are disposed, or, the stator poles to be disposed along the same circumference around the rotation shaft at pitches of substantially 360 degrees in electrical angle is removed.

7. The AC motor according to claim 6, wherein the plurality of stator poles in each module are magnetically aggregated to be linked to one of the stator stator-side neutral poles.

8. The AC motor according to claim 7, wherein both of the rotor and the stator are entirely or partially made of soft magnetic metal powder material and formed by pressing the material.

9. The AC motor according to claim 8, wherein both of the rotor and the stator are entirely or partially formed using a member made by mutually combining soft magnetic metal powder material and magnetic steel sheet.

10. The AC motor according to claim 1, wherein, when the plurality of modules are n (positive integer more than two), the stator poles included in each module are disposed along the same circumference whose center is the rotation shaft, at pitches of substantially 180 degrees in electrical angle, the disposed locations of the stator poles being shifted "360/n" degrees in electrical angle module by module.

11. The AC motor according to claim 10, wherein, in each module, in place of the stator poles to be disposed along the same circumference around the rotation shaft at pitches of substantially 360 degrees in electrical angle, the stator-side neutral poles are disposed, or, the stator poles to be disposed along the same circumference around the rotation shaft at pitches of substantially 360 degrees in electrical angle is removed.

12. The AC motor according to claim 3, wherein the plurality of stator poles in each module are magnetically aggregated to be linked to one of the stator stator-side neutral poles.

13. The AC motor according to claim 7, wherein both of the rotor and the stator are entirely or partially made of soft magnetic metal powder material and formed by pressing the material.

14. The AC motor according to claim 8, wherein both of the rotor and the stator are entirely or partially formed using a member made by mutually combining soft magnetic metal powder material and magnetic steel sheet.

15. The AC motor according to claim 14, wherein the plurality of modulus are two in number, one module being assigned to a P phase and the other module being assigned to a Q phase, the P and Q phases providing two phases,
   the stator poles for the P phase are disposed along the same circumference centered at the rotation shaft, at pitches of substantially 180 degrees in electrical angle, and
   the stator poles for the Q phase are disposed along the same circumference centered at the rotation shaft, at pitches of substantially 180 degrees electrical angle, but shifted substantially 90 degrees in electrical angle compared to the stator poles for the P-phase.

16. The AC motor according to claim 15, wherein
the winding for the P phase uses part of winding Lw of three-phase AC windings Lu, Lv and Lw, the winding Lu being oppositely arranged to the winding Lw and
the winding for the Q phase uses part of winding Lw of the three-phase AC windings Lu, Lv and Lw, the winding Lw being oppositely arranged to the winding Lv.

17. The AC motor according to claim 1, wherein the plurality of stator poles in each module are magnetically aggregated to be linked to one of the stator stator-side neutral poles.

18. The AC motor according to claim 1, wherein both of the rotor and the stator are entirely or partially made of soft magnetic metal powder material and formed by pressing the material.

19. The AC motor according to claim 1, wherein both of the rotor and the stator are entirely or partially formed using a member made by mutually combining soft magnetic metal powder material and magnetic steel sheet.

20. The AC motor according to claim 1, wherein the plurality of stator poles disposed in each module is grouped into n-groups and the stator poles belonging to each group are relatively shifted along the circumference by an amount of integral multiple of 360/(m×n) degrees in electrical angle, where n is an positive integer and m is an order of torque ripples to be decreased.

21. The AC motor according to claim 1, wherein the N magnetic poles and the S magnetic poles disposed in the rotor are grouped into n-groups, every magnetic pole, and the N magnetic poles belonging to each group and the S magnetic poles belonging to each group are relatively shifted along the circumference by an amount of integral multiple of 360/(m×n) degrees in electrical angle, where n is an positive integer and m is an order of torque ripples to be decreased.

22. The AC motor according to claim 1, wherein the plurality of modulus are two in number, each module being assigned to a U phase, a V phase, and a W phase providing three phases,
the stator poles disposed in each of the two modules are mutually shifted at pitches of substantially 120 degrees in electrical angle,
the winding included in one of the modules has a U-phase winding and a first V-phase winding whose turn directions are opposite to each other,
the winding included in the other of the modules has a second V-phase winding and a W-phase winding whose turn directions are opposite to each other, and
the first and second V-phase windings are connected in series and whose turn directions are opposite to each other.

23. The AC motor according to claim 22, wherein, of the windings providing the U-, V- and W-phase windings, the U-phase winding and the first V-phase winding to be wound at the same electromagnetic location are aggregated to a single winding and the second V-phase winding and the W-phase winding to be wound at the same electromagnetic location are aggregated to a single winding.

24. The AC motor according to claim 16, wherein the plurality of stator poles in each module are magnetically aggregated to be linked to one of the stator stator-side neutral poles.

25. The AC motor according to claim 16, wherein the plurality of stator poles disposed in each module is grouped into n-groups and the stator poles belonging to each group are relatively shifted along the circumference by an amount of integral multiple of 360/(m×n) degrees in electrical angle, where n is an positive integer and m is an order of torque ripples to be decreased.

26. The AC motor according to claim 16, wherein the N magnetic poles and the S magnetic poles disposed in the rotor are grouped into n-groups, every magnetic pole, and the N magnetic poles belonging to each group and the S magnetic poles belonging to each group are relatively shifted along the circumference by an amount of integral multiple of 360/(m×n) degrees in electrical angle, where n is an positive integer and m is an order of torque ripples to be decreased.

27. An apparatus controlling an AC (alternating current) motor according to claim 15, comprising means for controlling current Ip flowing through the winding for the P phase and current Iq flowing through the winding for the Q phase so that a relation of $$Ta = Wp \times Ep \times Ip + Wq \times Eq \times Iq$$

is met, where Ta is a torque command, $Ep = d\phi p/d\theta$ is a rate of changes in rotation angles of flux $\phi p$ interlinking the winding for the P-phase, $Eq = d\phi q/d\theta$ is a rate of changes in rotation angles of flux $\phi q$ interlinking the winding for the Q-phase, Wp is the number of turns of the winding for the P-phase, and Wq is the number of turns of the winding for the Q-phase.

28. The apparatus according to claim 27, wherein the plurality of stator poles in each module are magnetically aggregated to be linked to one of the stator stator-side neutral poles.

29. The apparatus according to claim 27, wherein the plurality of stator poles disposed in each module is grouped into n-groups and the stator poles belonging to each group are relatively shifted along the circumference by an amount of integral multiple of 360/(m×n) degrees in electrical angle, where n is an positive integer and m is an order of torque ripples to be decreased.

30. The apparatus according to claim 27, wherein the N magnetic poles and the S magnetic poles disposed in the rotor are grouped into n-groups, every magnetic pole, and the N magnetic poles belonging to each group and the S magnetic poles belonging to each group are relatively shifted along the circumference by an amount of integral multiple of 360/(m×n) degrees in electrical angle, where n is an positive integer and m is an order of torque ripples to be decreased.

* * * * *